(12) United States Patent
Flaherty et al.

(10) Patent No.: US 8,025,196 B2
(45) Date of Patent: Sep. 27, 2011

(54) ANTI-SWAY APPARATUS FOR A RACK ARRANGEMENT

(75) Inventors: Joseph R. Flaherty, Prospect, CT (US); Keith Prescott, Cambridge, VT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 12/888,341

(22) Filed: Sep. 22, 2010

(65) Prior Publication Data

US 2011/0068138 A1 Mar. 24, 2011

Related U.S. Application Data

(60) Provisional application No. 61/244,850, filed on Sep. 22, 2009.

(51) Int. Cl.
*B60R 9/10* (2006.01)
(52) U.S. Cl. .......... 224/533; 224/532; 224/924
(58) Field of Classification Search .......... 224/924, 224/532, 533, 537, 556, 567, 571; 16/242, 16/267, 266; D12/407, 408
See application file for complete search history.

(56) References Cited

U.S. PATENT DOCUMENTS

| | | | | |
|---|---|---|---|---|
| 1,496,466 A | * | 6/1924 | Jackson | 16/260 |
| 2,555,473 A | * | 6/1951 | Deaton | 220/4.23 |
| 3,805,325 A | * | 4/1974 | Lee | 16/262 |
| 4,598,889 A | * | 7/1986 | Remington | 244/87 |
| 4,603,452 A | | 8/1986 | Paciorek | |
| 5,259,542 A | | 11/1993 | Newbold et al. | |
| 5,455,987 A | | 10/1995 | Svehaug | |
| 5,938,093 A | | 8/1999 | Bloemer et al. | |
| 6,616,023 B1 | | 9/2003 | Dahl et al. | |
| 6,988,645 B1 | | 1/2006 | Nusbaum et al. | |
| 7,213,731 B1 | * | 5/2007 | Kolda | 224/537 |
| 2007/0235487 A1 | * | 10/2007 | Bogoslofski et al. | 224/533 |
| 2007/0251964 A1 | | 11/2007 | Gunn | |
| 2008/0093404 A1 | | 4/2008 | Clausen et al. | |
| 2008/0190979 A1 | * | 8/2008 | Robins et al. | 224/492 |
| 2009/0120986 A1 | * | 5/2009 | Sautter et al. | 224/497 |

FOREIGN PATENT DOCUMENTS

DE 19821608 A1 11/1999
GB 2425997 A 11/2006

OTHER PUBLICATIONS

"Bicycle Parts and Cycling Accessories Store—Saris Bones 2—Bike Rack—Gray—Trunk and/or Hatchback Racks—Car Racks", Copyright 2007-2009; Retrieved on Sep. 20, 2010 from: http://cycling.jn10.com/bicycles.php?id=455556294&p=Saris-Bones-2-Bike-Rack---Gray&c=Car-Racks.

* cited by examiner

*Primary Examiner* — Justin M Larson
*Assistant Examiner* — Corey N Skurdal
(74) *Attorney, Agent, or Firm* — Novak Druce + Quigg LLP

(57) ABSTRACT

A bicycle carrier rack mountable to a vehicle and having a load bearing arm, the arm having an attachment member on its underside having a locking portion. An anti-sway member is attachable to the locking portion of the member, the anti-sway member having an attachment portion on one end of the anti-sway member, the anti-sway member having an engaged position wherein the anti-sway member prevents sway of the bicycle. The attachment portion encloses a central aperture having an opening in a side of the attachment portion to the central aperture. The locking portion is sized to receive the opening of the anti-sway member when the anti-sway member is in a non-engaged position, and wherein the locking portion is sized to prevent passage through the opening when anti-sway member is in the engaged position, the anti-sway member being rotatable between the engaged and non-engaged positions.

3 Claims, 35 Drawing Sheets

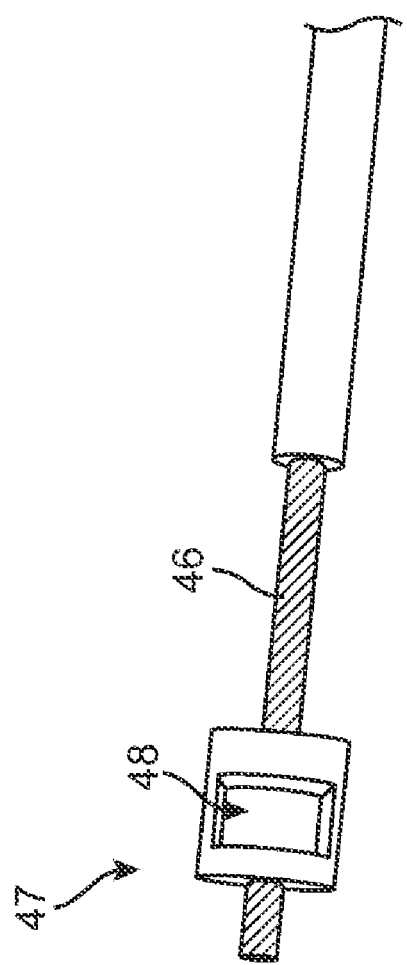
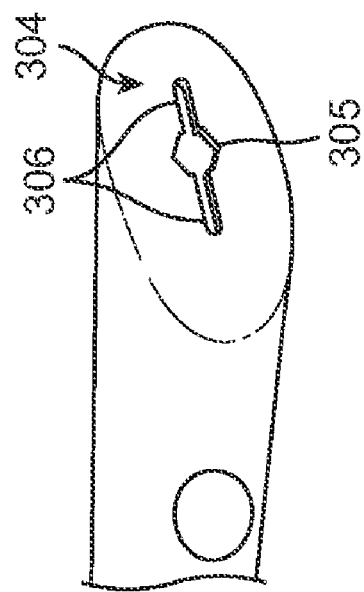
FIG. 8D

ANTI-SWAY APPARATUS FOR A RACK ARRANGEMENT

CROSS REFERENCE TO RELATED APPLICATIONS

This is application claims priority to provisional Application No. 61/244,850, the disclosure of which is hereby incorporated by reference in its entirety.

TECHNICAL FIELD

The present disclosure relates to load carriers for transporting various articles, and in particular bicycle carriers. In particular, the present application is directed to anti-sway devices for bicycle racks and carriers.

BACKGROUND OF THE INVENTION

Bicycle carriers are well known and very popular for cyclists and sports enthusiasts. Oftentimes it is of interest to ride in particular areas that are far from home, and thus transporting a bicycle becomes necessary. Accordingly, trunk and hitch mounted bicycle carriers have been employed for this purpose as they are generally easily to install and use.

Generally a bicycle rack will have some apparatus for attachment to a vehicle, either through a hitch or attachment to the trunk. Besides having a portion for attachment to a vehicle, there will also be load bearing arms onto which one can place a bicycle. Additionally, these load bearing arms generally have "cradles" installed thereon. Cradles generally have a softer material and directly receive the tubes of the bicycle when bicycles are installed. Such cradles aid in holding the bicycles on the load bearing arms. Furthermore, straps are employed on the arms or cradle to secure the bicycle onto the cradles.

An issue that has arisen is that bicycles once installed in the cradles on the rack arms have a tendency to rock back in forth (or "sway"), as there is no support in the lower portions of the bicycle. Devices, such as anti-sway apparatuses, have been employed which extend from the bicycle rack arms to prevent rocking of the bicycle. However, what is needed is an effective anti-sway device which is easy to use and facilitates attachment and removal from the bicycle rack.

SUMMARY OF THE INVENTION

Disclosed herein is an anti-sway device which is easily attached and removed from a bicycle rack. Furthermore, the anti-sway devices are easily employed for reducing or eliminating rocking or "sway" of a bicycle held in the bicycle rack.

In some embodiments is disclosed a bicycle carrier rack for mounting on a vehicle, the rack having an arm extending away from the vehicle for carrying a bicycle, the arm including an attachment member on an underside of the arm having a locking portion suspended a distance from the arm and extending in the same longitudinal direction of the arm; an anti-sway member removably attachable to the locking portion of the member, the anti-sway member having a contact portion for abutting against a bicycle installed in the bicycle carrier and an attachment portion on one end of the anti-sway member, the anti-sway member having an engaged position wherein the anti-sway member prevents sway of the bicycle; the attachment portion enclosing a central aperture and having an opening in a side of the attachment portion to the central aperture, the locking portion being sized to receive the opening of the anti-sway member when the anti-sway member is in a non-engaged position, and wherein the locking portion is sized to prevent passage through the opening when anti-sway member is in the engaged position, the anti-sway member being rotatable between the engaged and non-engaged positions.

In further embodiments when anti-sway member is in a non-engaged position it is rotated to an essentially horizontal position such that the opening in the side of the attachment portion is aligned with the locking portion for insertion thereon and removal. In further embodiments, when the anti-sway member is in a non-horizontal position it is in an engaged position and the opening in the side of the attachment portion is not aligned with the locking portion for insertion and removal.

In still further embodiments, the locking portion has a vertical side and a horizontal side and where the opening in the side of the attachment portion is sized to exceed that of the horizontal side and the vertical side is sized to exceed the opening in the side of the attachment portion and wherein the opening is aligned with the horizontal sides only when rotated to an essentially horizontal position.

In other embodiments, the locking portion includes a bar having a narrow cross-section and a broad cross-section wherein the narrow cross-section is sized to permit insertion and removal of the opening over the locking portion and the broad cross-section is sized to prevent insertion and removal of the opening over the locking portion.

In other embodiments, the opening in the side of the attachment portion is aligned with the narrow cross-section when in the non-engaged position for insertion and removal over the locking portion.

In other embodiments, the central aperture is sized to enclose the locking portion and permit rotation of the anti-sway member between the engaged and non-engaged position on the locking portion.

In other embodiments, the central aperture cross-section is larger than the opening cross-section.

In other embodiments, the contact portion extends from the attachment portion and the opening is positioned at essentially a right angle or less with respect to the extending attachment portion.

In further embodiments there is disclosed an anti-sway device for a bicycle rack for preventing or reducing sway of a bicycle installed in the rack, the anti sway including an attachment portion, an anti-sway portion extending from the attachment portion, the anti-sway portion having a contact surface for abutting against a bicycle tube for reducing sway, the attachment portion having a central aperture with an opening in a side of the attachment portion forming a channel to the central aperture, the opening positioned at essentially a right angle or less with respect to the extending anti-sway portion.

In further embodiments the central aperture is essentially circular for permitting rotation of the anti-sway device when attached to a bicycle rack.

In further embodiments, the anti-sway portion extending from the attachment portion is arced. Additionally, the anti-sway portion can be concave on one side to receive a bicycle tube.

In still other embodiments, there is disclosed a cradle for a bicycle rack and preventing sway of a bicycle installed therein, the cradle including an attachment member on an underside of the cradle having a locking portion suspended a distance from the cradle; an anti-sway member removably attachable to the locking portion of the member, the anti-sway member having a surface for abutting against a bicycle installed in the bicycle rack and an attachment portion, the anti-sway member having an engaged position wherein the anti-sway member extends from the cradle for preventing sway of the bicycle; the attachment portion enclosing a central aperture and having an opening in a side of the attachment portion forming a channel to the central aperture; the locking portion being sized to receive the opening of the anti-sway member when the anti-sway member is in a non-engaged position, and wherein the locking portion is sized to prevent passage through the opening when anti-sway member is in the engaged position, the anti-sway member being rotatable between the engaged and non-engaged positions.

BRIEF DESCRIPTION OF THE FIGURES

A bicycle rack according to the present disclosure shall is described with reference to the following figures, in which:

FIG. 8D is a perspective view of a narrow end of a cover for a cable end;

FIG. 8I is a perspective view of a cover enclosing a portion of a hooked end piece for a cable end;

DETAILED DESCRIPTION OF THE INVENTION

Detailed embodiments of a rack arrangement are described herein; however, it is to be understood that the disclosed embodiments are merely exemplary and accordingly, the rack arrangement may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the inventions.

Figure 1A:
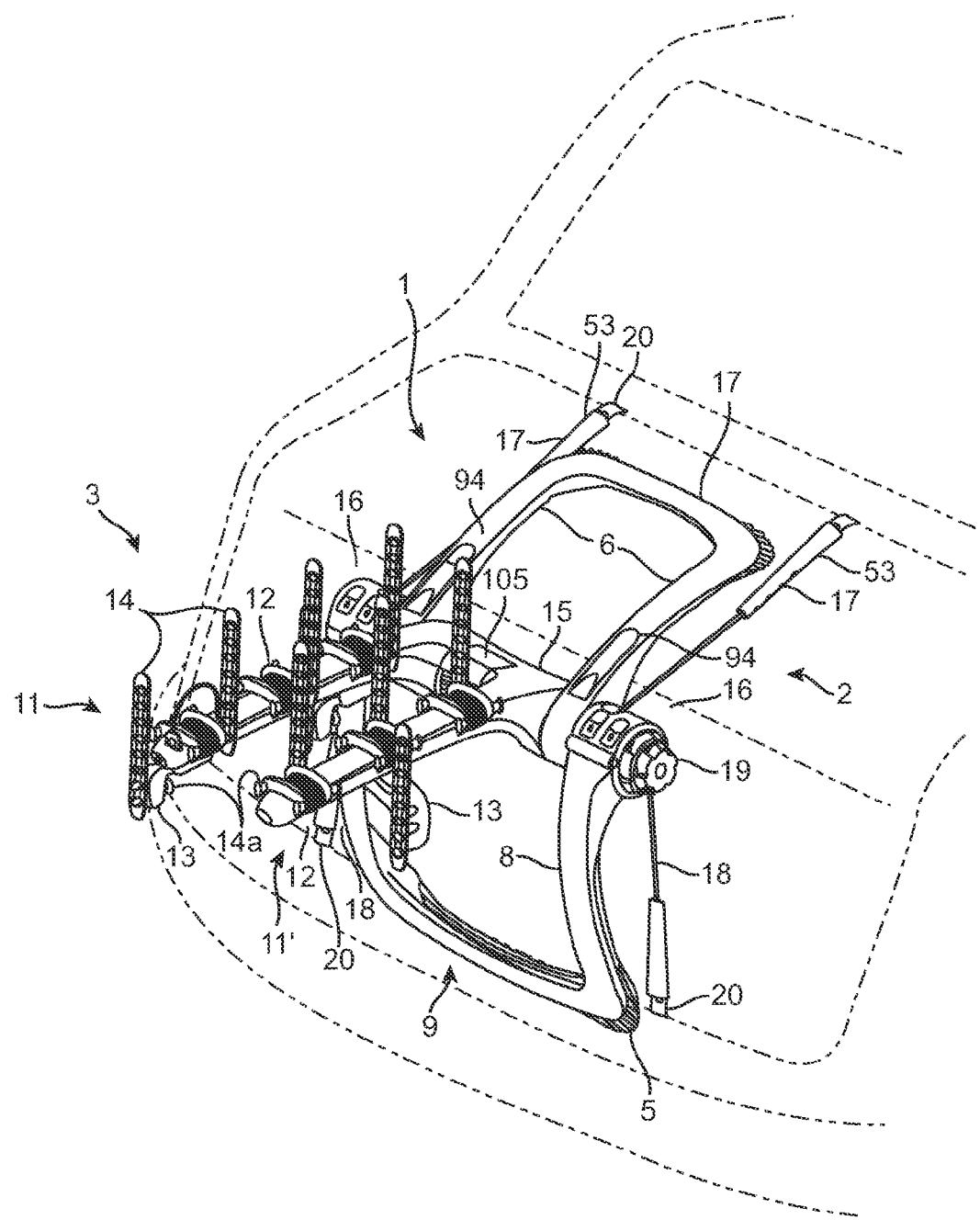
FIG. 1A is a perspective view of one embodiment of a truck mounted bicycle rack.

Referring to the Figures, one exemplary embodiment of a hanging bicycle carrier 1 is shown in FIG. 1A which can be mounted on the rear of a vehicle. The rear of the vehicle may include a trunk and a bumper portion.

The carrier 1 includes a mounting frame portion 2 and a bicycle load carrying portion 3. The mounting frame portion 2 includes upper mounting member 4 and lower mounting member 5. Upper mounting member 4 is generally U-shaped with a pair of legs 6 interconnected by a cross-member 7. Likewise, lower mounting member 5 is generally U-shaped with a pair of legs 8 interconnected by a cross-member 9. In the depicted embodiment, the upper mounting legs 6 as well as the lower mounting legs 5 may also have a curved arching shape as they extend toward the vehicle, thereby facilitating a more secure grip onto the vehicle. The upper mounting member 4 and lower mounting member 5 each have a rubber and/or soft plastic buffering material along the corners and cross-members. Such material allows softer contact with the vehicle as the mounting portion abuts against the vehicle and may also provide some friction with the vehicle to prevent sliding or movement of the rack across the legs.

The bicycle load carrying portion 3 is comprised of two carrier arms 11, 11' which project rearward away from the vehicle and are capable of carrying the load of one or more bicycles thereon. The arms 11, 11' have cradles 12 which are integrally formed into each arm 11, 11'. Cradles 12 may have a trough formed therein for receiving a bicycle and made of a material such as rubber and/or soft plastic so as not to scratch the bicycle. The cradles may optionally have an antisway devices 13 attached thereto. Furthermore, straps 14, having a plurality of through-holes, may be attached to tabs 14a and pulled over a bicycle installed in the rack to secure it a cradle 12. Additionally, straps 14, also having a plurality of through-holes, may be attached to anti-sway devices 13 to be pulled over for securement of a bicycle.

The carrier arms 11, 11', upper mounting member 4 and lower mounting member 5 connectable about hub 15. At either end of hub 15 are ratcheting adjustment arrangements 16. Upper flexible cables 17 and lower flexible cables 18 extend from the ratcheting arrangements 16 and can attach onto a vehicle. Additionally the flexible cables may be refracted back into the ratcheting arrangements 16 by rotation of knobs 19. At the end of the upper cables 17 and lower cables 18 are hooks 20 which hook into portions of a vehicle. Accordingly, the rack 1 may be mounted to a vehicle by the interaction of forces, such that the flexible cables pull the bicycle rack 1 against the vehicle while at the same time mounting members 4 and 5 abut against vehicle. This causes the rack to be stably mounted to the vehicle and carry a bicycled installed thereon.

Figure 2:
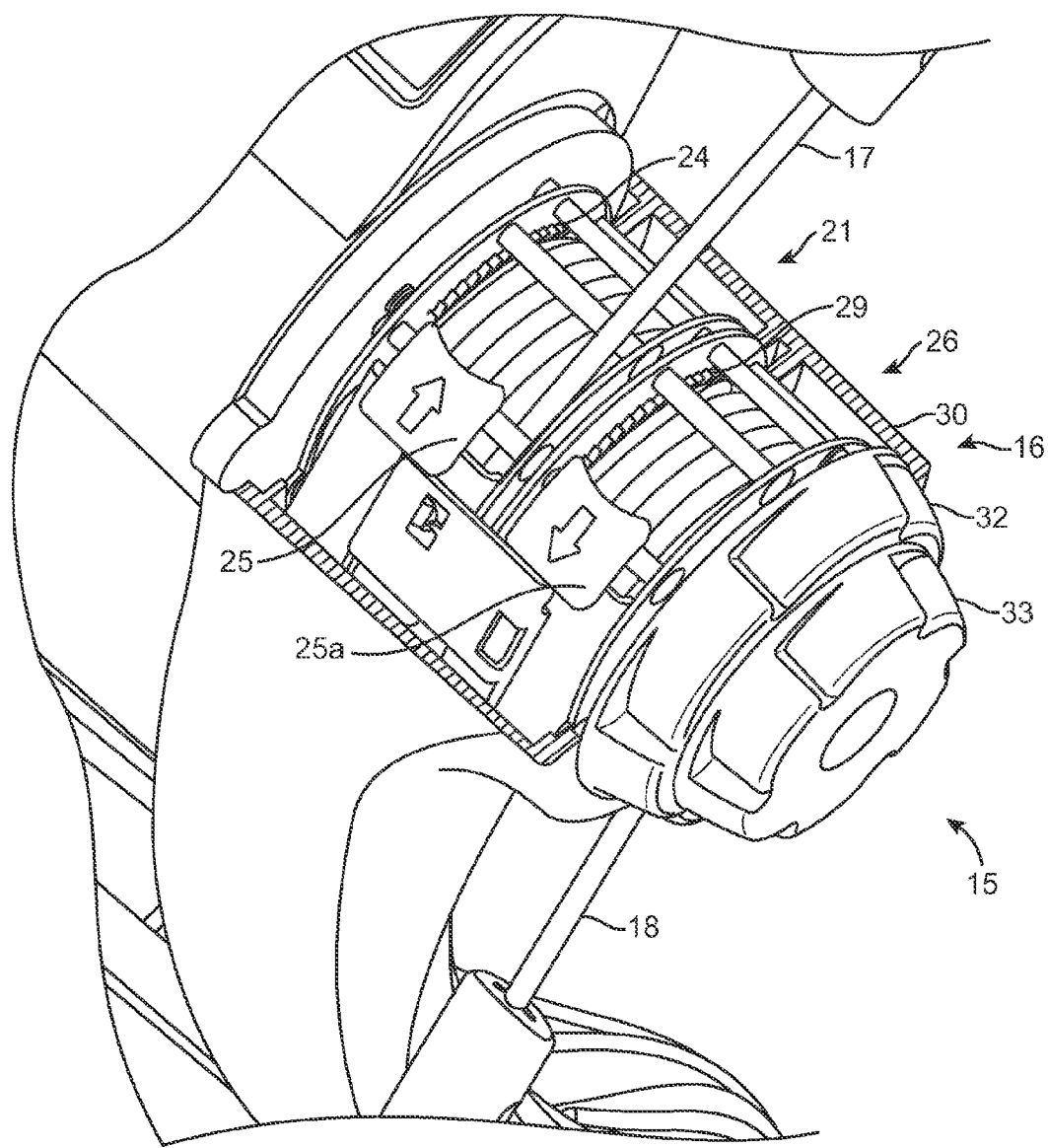
FIG. 2 is a perspective view of one embodiment of a ratcheting adjustment arrangement.
Figure 3:
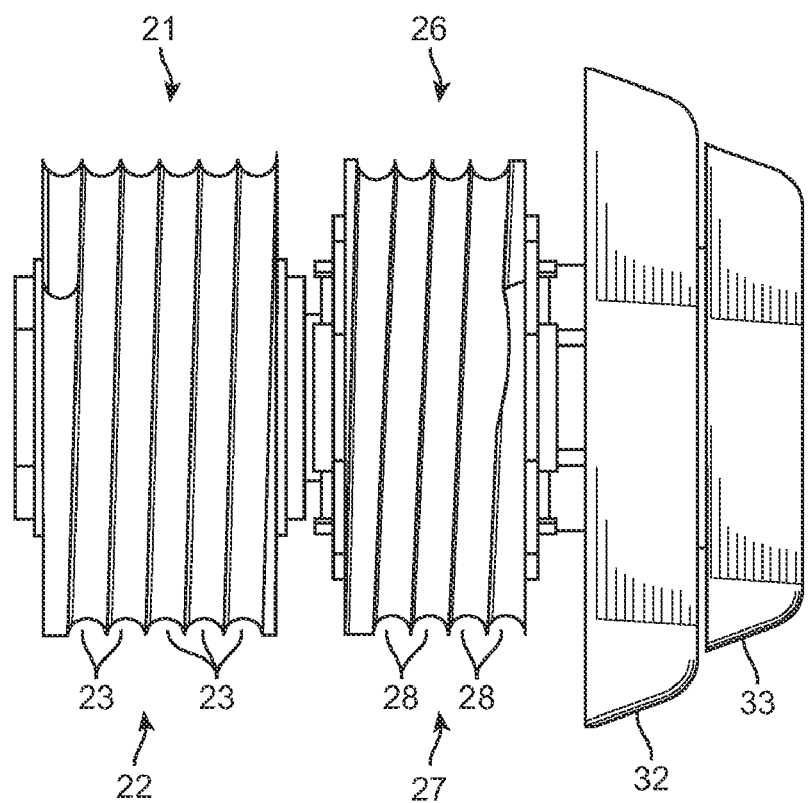
FIG. 3 is an illustration of the inner and outer spool components of the ratcheting adjustment arrangement.

Referring now to FIG. 2, one exemplary embodiment a ratcheting adjustment arrangement 16 is illustrated therein. The depicted ratcheting arrangement 16 is located at the end of the hub 15 and has an inner spool 21. Upper flexible cable 17 extends in an upward direction from inner spool 21. Inner spool 21 is substantially circular and is rotatable around a central axis for retraction and/or release of the flexible cable 17. Furthermore, inner spool 18 has trough 22 where the cable 17 will be received when retracted. As depicted in FIG. 3, across the surface of the trough 22 are tracks 23 which are sized in dimension to correspond to the diameter of the flexible cable 17. Accordingly, as the flexible cable 17 is retracted and drawn into the inner spool 21, it will be drawn onto these tracks. Therefore, there will only be one layer of flexible cable 17 drawn across the trough 22. This has the effect of preventing bunching of the cable and interference with retraction or release.

For example, in one embodiment, if the cable 17 is already withdrawn out of the spool its full length, as it is first retracted, it will be drawn into the most inner track 21. As the cable 17 is drawn in, it will be gradually drawn across the trough from the most inner track to the most outer track thereby providing one layer, side-by-side of cable 17 across the trough. Ordinarily, spooling without such tracks along with multiple layers of cable one on top of the other can lead to the complications and blocking of the cable during refraction or release. Such problems are further exacerbated when the flexible cable has a plastic coating. However, utilizing the tracks and single layer of cable as disclosed according to embodiments herein facilitates retraction and release of the cable even with a plastic coating around the cable.

Also shown in FIG. 2, inner spool 21 has gear teeth 24 on the sides for rotation of the spool. Furthermore, latch 25 is provided to allow a user to toggle between retract and release of the cable 17. In the embodiment shown in FIG. 2, when the latch 25 is down, the spool 17 may rotate only in the retraction direction wherein the flexible cable 17 is drawn in around the spool. In such configuration the inner spool 21 is locked from rotating to prevent the cable 17 from being drawn out from the spool. When latch 25 is pulled in an upward direction by a user, the latch is released and will allow the cable 17 to be retracted from the spool.

Also depicted in FIG. 2 is outer spool 26, which operates similarly in mechanism to the inner spool 18. Outer spool 26 has flexible cable 18 extending in a downward direction which can be retracted and released from the spool. Outer spool 26 is positioned adjacent the inner spool 21 and as shown in FIG. 3, also has a trough 27, with tracks 28 sized in dimension to correspond to the diameter of the flexible cable 18 such that only one layer of cable is drawn across trough 27. The inner and outer spools may have the same number of tracks as or a different number. For example, inner spool 21 may have a greater number of tracks than the outer spool, and thus would have a larger cross sectional area to draw in cable. Additionally, in such case the upper flexible cable 18 would be longer than lower flexible cable 18. Accordingly, both the inner and outer spools may have any number of tracks from 3-10, including 3, 4, 5, 6, 7, 8, 9, or 10 tracks. Outer spool 26 also has gear teeth 29 for rotation thereof, and furthermore latch 25a works similar in principle to latch 25 for release and retraction of the cable 18.

As the inner and outer spools are adjacent one another, they may be formed in one housing 30. One or more cross-rivets 31 may extend across the entire housing 30 suspended a distance above the spools. The cross-rivets 31 are spaced above the spools such that there is room enough only for one layer cable in the spools. This is a further step for assuring there can be only one layer of flexible cable across the length of the spools.

Figure 4:
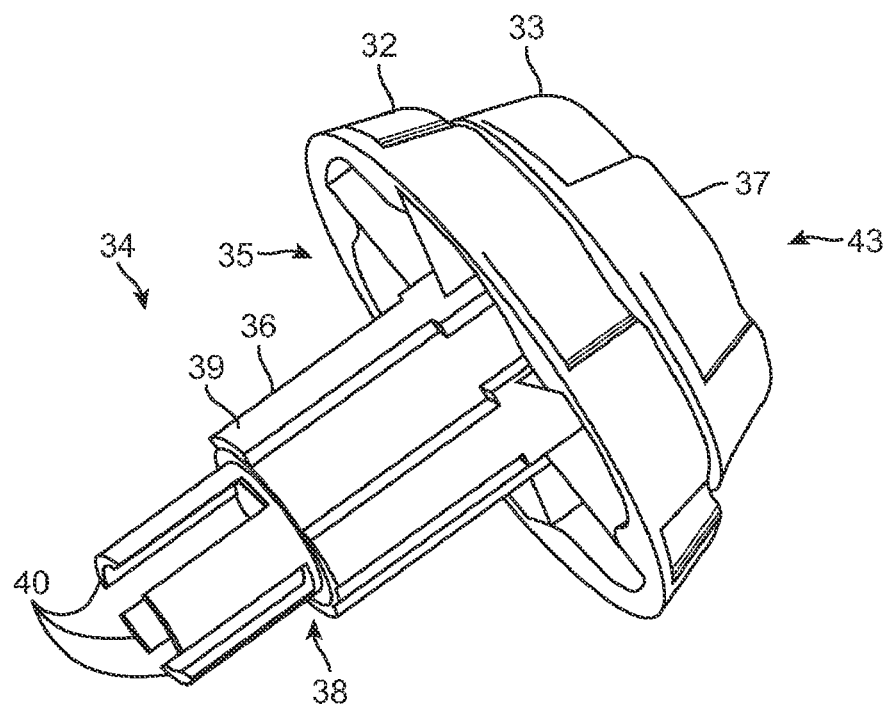
FIG. 4 is an illustration of a spool assembly central member component of the ratcheting adjustment arrangement.

There are additionally two end knobs, inner knob 32 and outer knob 33 and may be turned by a user to rotate the inner and outer spools 21 and 26 for refraction or release of the cable. As depicted in FIGS. 2, 3 and 4, outer knob 33 may be smaller in diameter compared to inner knob 32 to facilitate access to both. Correspondingly, the inner knob 32 may be used for rotation of outer spool 26, and outer knob 33 may be used for rotation of inner spool 21. In other embodiments, this can be reversed such that inner knob 32 may be used for rotation of the inner spool 21 and outer knob 33 may be used for outer spool 26. Furthermore, the knobs may be positioned along the hub or rack, but in such a manner as to provide rotation to the inner and outer spools 21 and 26.

Illustrated in FIG. 4 is the spool assembly central member 34 along with inner and outer knobs 32 and 33. The inner knob piece 35 is made up of the inner knob 32 connected with an external axle segment 36. The outer knob piece 37 is made up of outer knob 33 which is connected with an internal axle segment 38 that extends through the external axle segment 36 of the inner knob piece and is freely rotatable with respect to the outer knob piece 35. Additionally, the external axle segment 36 has outer projections 39 and the internal axle segment 37 has inner tabs 40.

Figure 5:
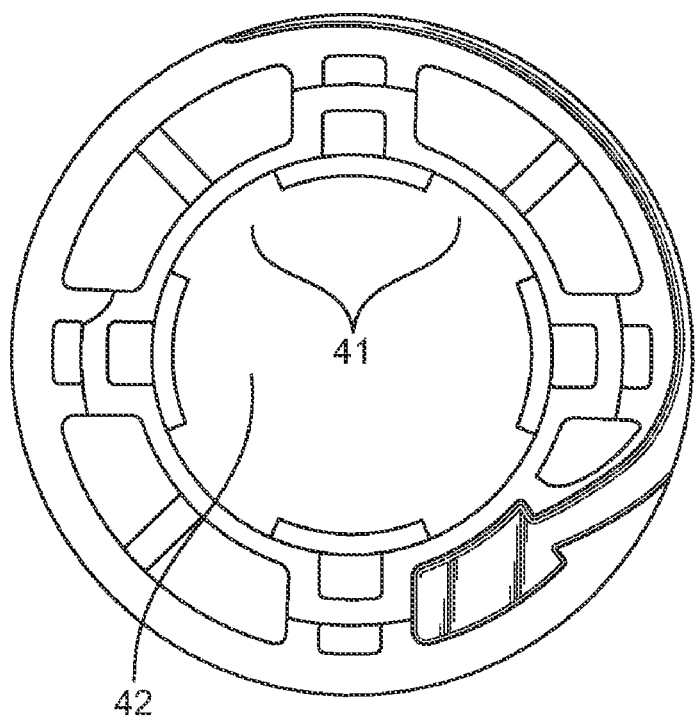
FIG. 5 is an illustration is a side view of an outer spool component of the ratcheting adjustment arrangement.
Figure 6:
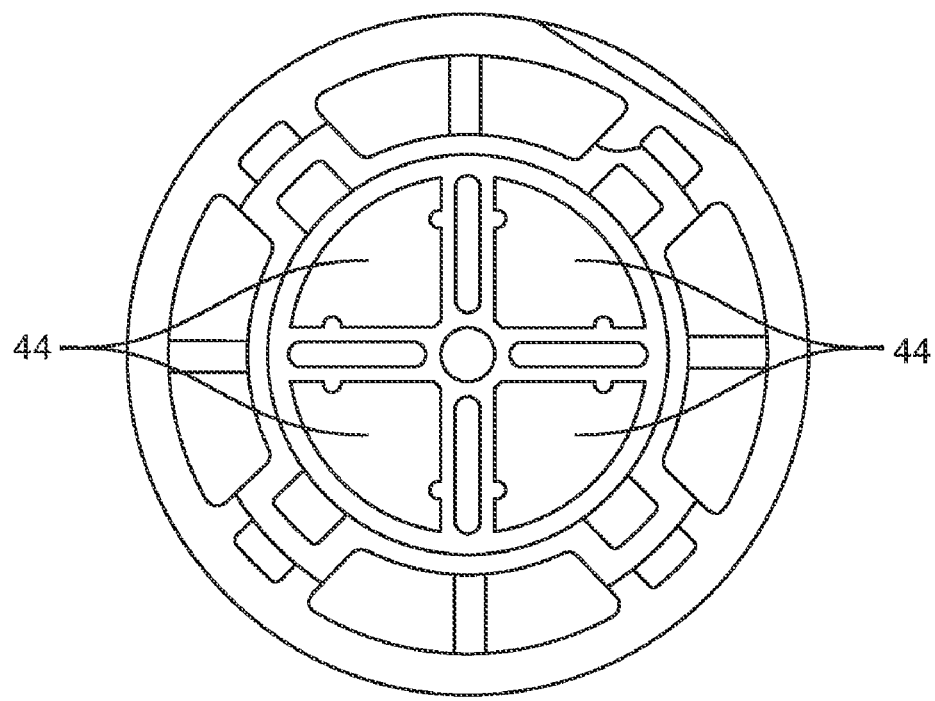
FIG. 6 is an illustration is a side view of an inner spool component of the ratcheting adjustment arrangement.

Depicted in FIG. 5 is a side view of outer spool 26 having outer spool apertures 41 and a central member aperture 42. The outer spool 26 can be inserted over the central member 34 of the spool assembly 43, wherein the outer spool apertures 41 will align with the outer projections 39 of the central member 34. Depicted in FIG. 6 is a side view of inner spool 21 having inner spool apertures 44. The inner spool 21 can be inserted into central member 34 of the spool assembly, wherein inner spool apertures 44 will receive inner tabs 40 of the central member 34. Accordingly, because the inner spool 21 is connected with the outer knob piece 37, when the outer knob 33 is rotated, the inner spool 21 will also rotate. Correspondingly, because outer spool 25 is connected with the inner knob piece 35, when the inner knob 32 is rotated, the outer spool 25 will also rotate. In this manner, both the inner and outer spools may be rotated independently of one another.

Figure 7:
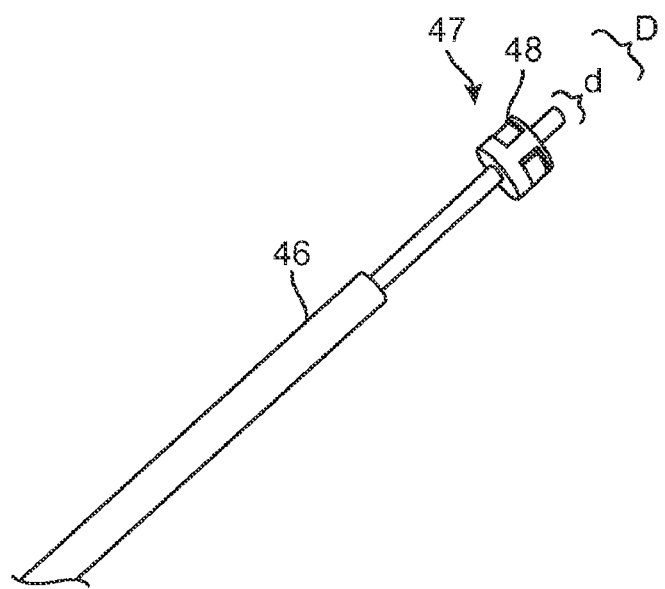
FIG. 7 is a perspective view of an end of a cable of a truck mounted bicycle rack.
Figure 8A:
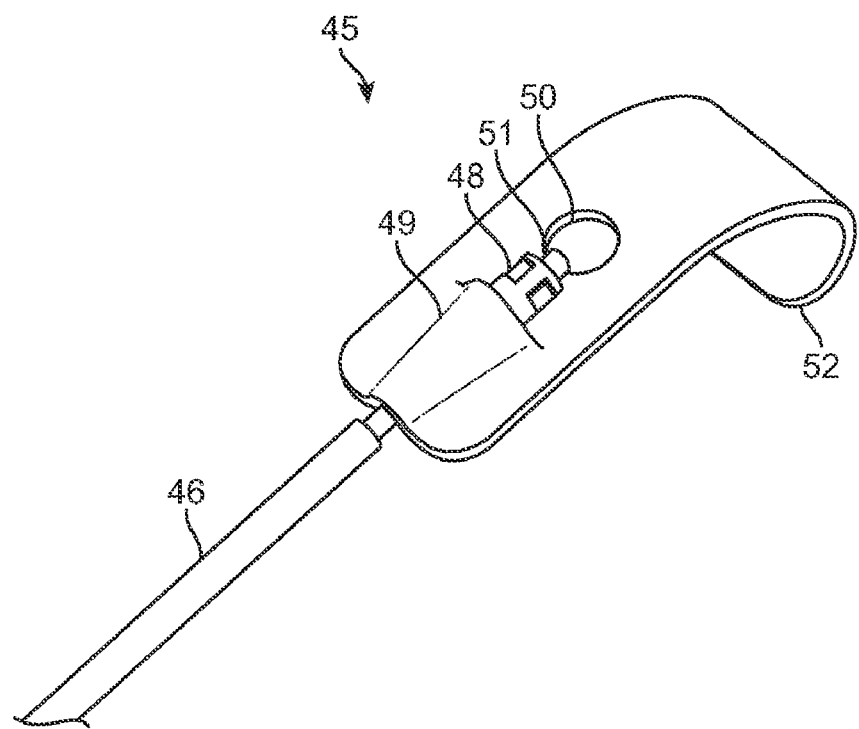
FIG. 8A is a perspective view of one embodiment of an end of a cable with a hooked end piece.
Figure 8B:
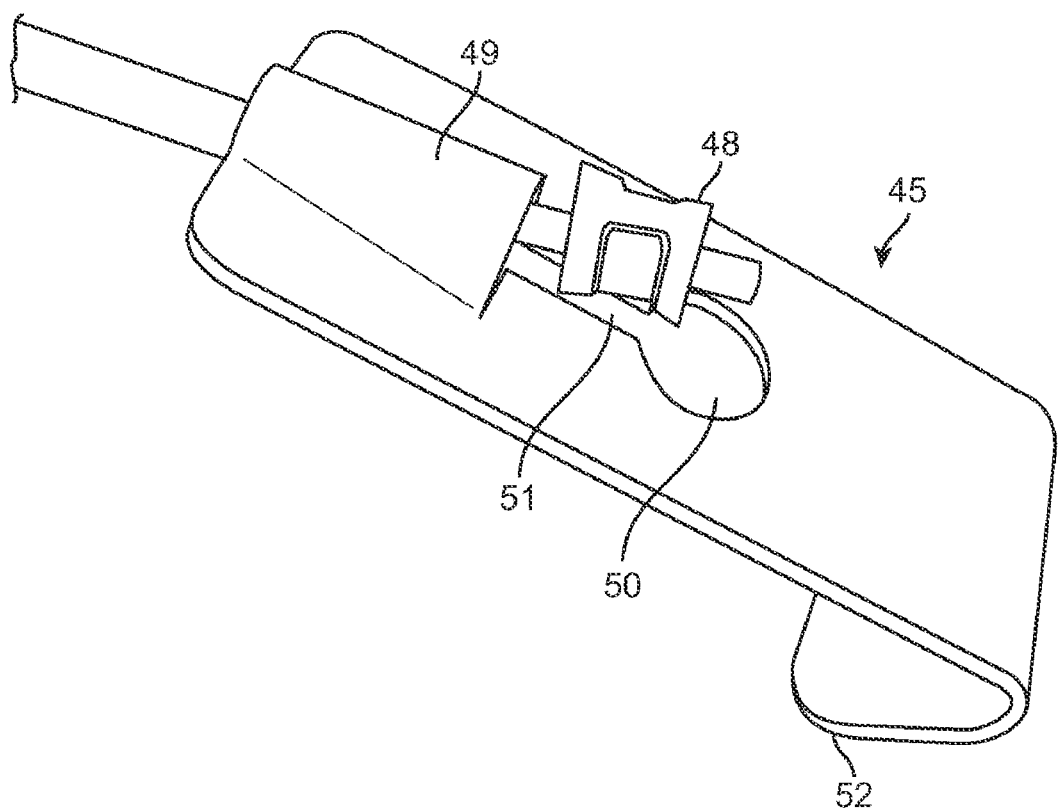
FIG. 8B is a perspective view of one embodiment of an end of a cable of a truck mounted bicycle rack with a hooked end piece.

Referring now to FIGS. 7-8B, illustrated therein is a hooked end piece 45 and a flexible cable 46, wherein the hooked end piece 45 can be removed and attached with the flexible cable 46. As shown in FIG. 7 is a flexible cable 46 with an end portion 47. The flexible cable may be made of metal wire, and may have a plastic coating. The flexible cable end portion 47 has a blocker piece 48 attached on or near the end of end portion 47. The blocker piece 48 has a first diameter "D" which is larger than the diameter "d" of the flexible cable 46.

Illustrated in FIG. 8A is hooked end piece 45 which attaches to the end of the flexible cable 46. The hooked end piece 45 is made up of a rigid body with a first end having a tunnel portion 49. The tunnel portion 49 is an arched portion of hooked end piece. In middle portion of the hooked end piece 45 is an aperture 50 which further has an aperture channel 51 leading to the tunnel portion 49. The hooked end piece 45 additionally has a hooked portion 52 on a second end, opposite the end having the tunnel portion 49 for attachment to a portion of a car.

The hooked end piece 45 is removable from the end of the flexible cable 43. The tunnel portion 49 is sized to correspond to the diameter "d" to allow passage of the flexible cable 46 therethrough. However, the tunnel portion is also smaller than the diameter "D" of the blocker piece 48, such that it is restricted from passing therethrough. Accordingly, when the hooked end piece 45 is attached to a vehicle and at the same time the flexible cable 43 is tightened by use of the ratcheting arrangement 16, the blocker piece 48 is drawn against the tunnel portion 49 and fixed at the mouth of the tunnel portion 49.

When removing the hooked end piece 45, the blocker piece 48 may be moved forward toward the hooked portion, as illustrated in the configuration shown in FIG. 8B. The aperture channel 51 is sized to allow passage of the flexible cable with diameter "d" therethrough, however, is also sized to be smaller than diameter "D" therefore preventing passage of the blocker piece 48. However, the aperture 50 is sized to allow passage of the blocker piece 48 to pass therethrough.

Accordingly, when the blocker piece 48 is moved forward as depicted in FIG. 8B, the flexible cable may pass through the aperture channel 51, and the blocker piece 48 may be pulled through aperture 50. In this way the hooked end piece 45 may be removed from the flexible cable 43. It may be attached by merely performing the reverse case, by inserting the blocker piece 48 through the aperture 50 and then pulling the blocker piece 48 back against and into the tunnel portion 49.

Moreover, the tunnel portion 49 may have a wider diameter toward the middle portion of the hooked end piece, and a narrower diameter as it tapers toward the end of the hooked end piece 45. This enables the blocker piece to nest just inside the tunnel portion 49 while at the same time preventing it from passing all the way through the tunnel portion 49.

Referring back to FIG. 1A, the flexible cables 17 and 18 may have a covering 53 over a length of the cable, and also covering a portion of the hooked end piece 45. This allows a user to easily grasp the cables as well as can help prevent the hooked end piece from being inadvertently removed from the flexible cable.

Figure 8C:
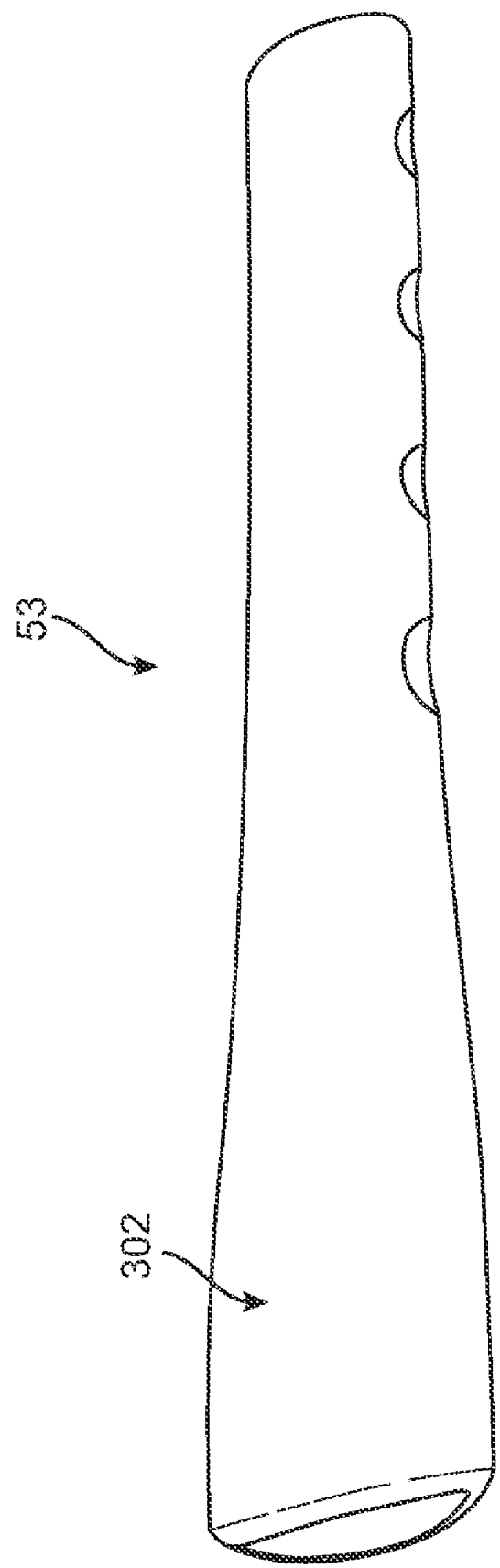
FIG. 8C is a perspective view of a cover for a cable end.

Covering 53 is further described with reference to FIGS. 8C through FIG. 8I. As shown in FIG. 8C, covering 53 has an elongate body with a narrow end 301 and a broad end 302. The broad end 302 has an aperture 302A which is sized to receive and enclose the blocker piece 48 and a portion of the hooked end piece 45. The covering 53 is made up of a flexible material, preferably a rubber, elastomer or soft plastic. Additionally, covering 53 has finger grips 303 on each side to facilitate gripping by a user. As further shown in FIGS. 8D-8H, the covering 53 will be inserted narrow end 301 first over the cable, with the broad end 302 extending toward the end of the cable having the blocker piece 48 and hooked end piece 45. The broad end 302 will fit over the blocker piece 48 and the hooked end piece 45.

Figure 8E:
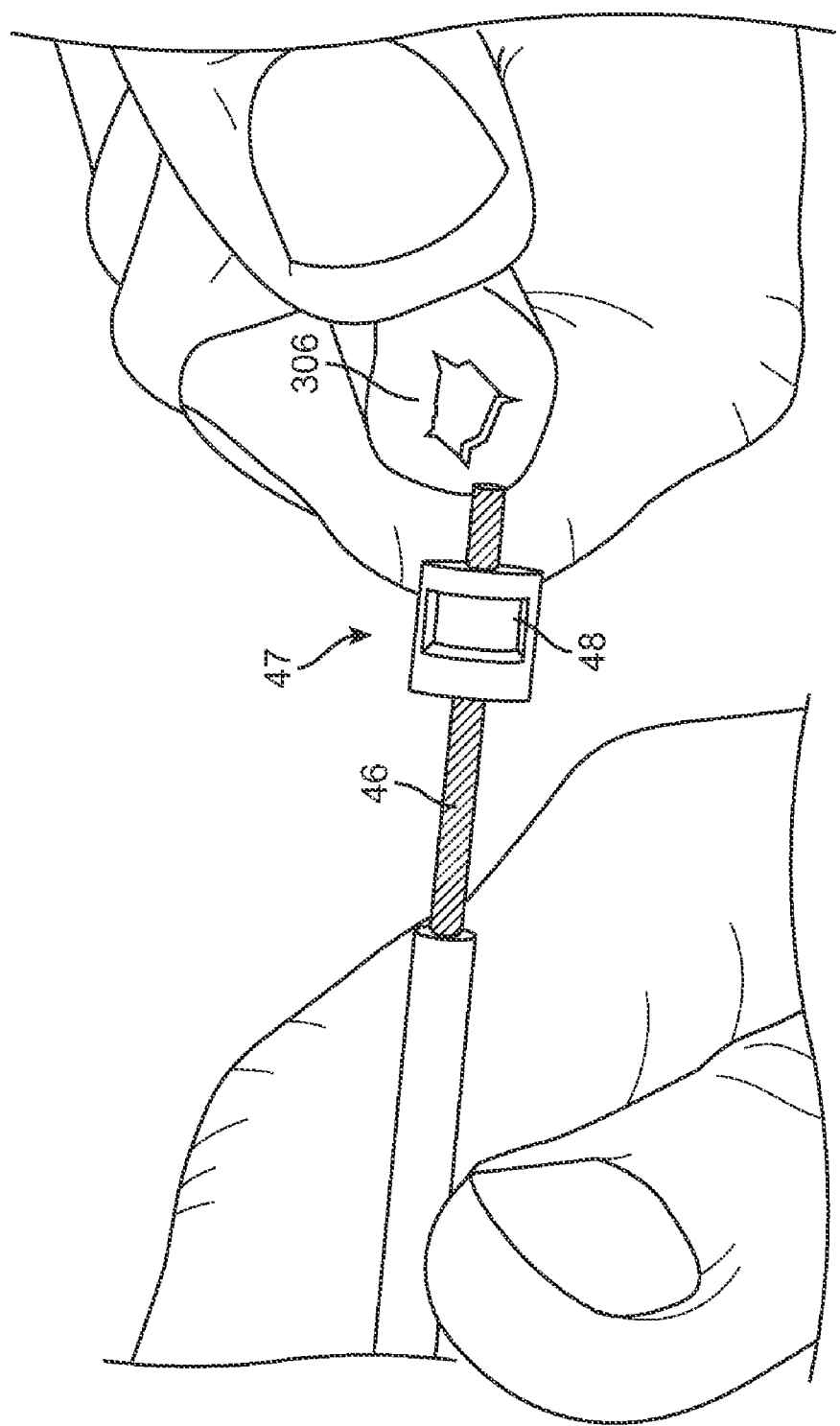
FIG. 8E is a perspective view of a squeezed narrow end of a cover for a cable end.
Figure 8F:
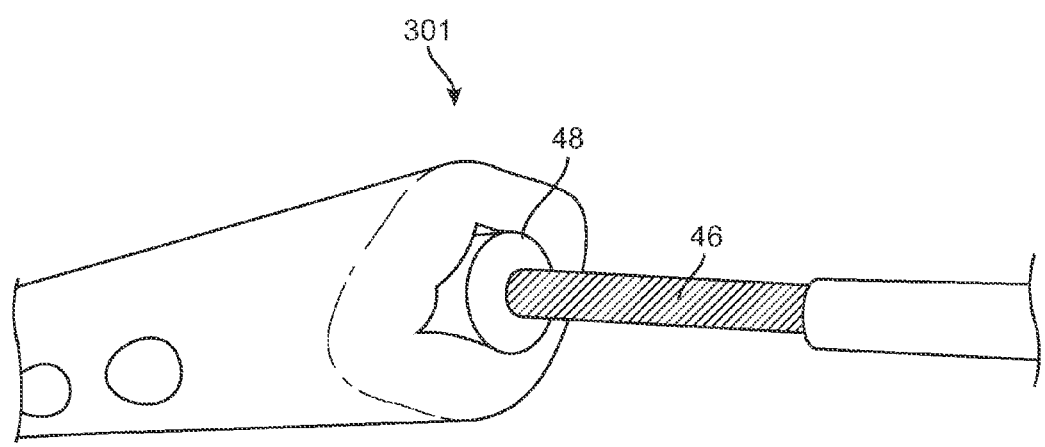
FIG. 8F is a perspective view of a cover insertable over a cable end.

As shown in FIG. 8D, the narrow end 301 is shown just prior to being inserted over the end portion 47 of flexible cable 46. Narrow end 301 has an aperture 304 at its end. In preferred embodiments, the narrow end 301 will have an elliptical or oval shape. Accordingly, in these embodiments it will have a longer major axis and a shorter minor axis. The aperture 304 has a central cavity 305 with horizontal slits 306 on either side. The central cavity 305 is sized to receive the blocker piece 48. As illustrated in FIG. 8E the narrow end can be squeezed along its major axis, thus causing the horizontal slits 306 together with the central cavity 305 to form a larger aperture 306. In this way it can be more easily fitted over the blocker piece 48 as shown in FIG. 8F.

Figure 8G:
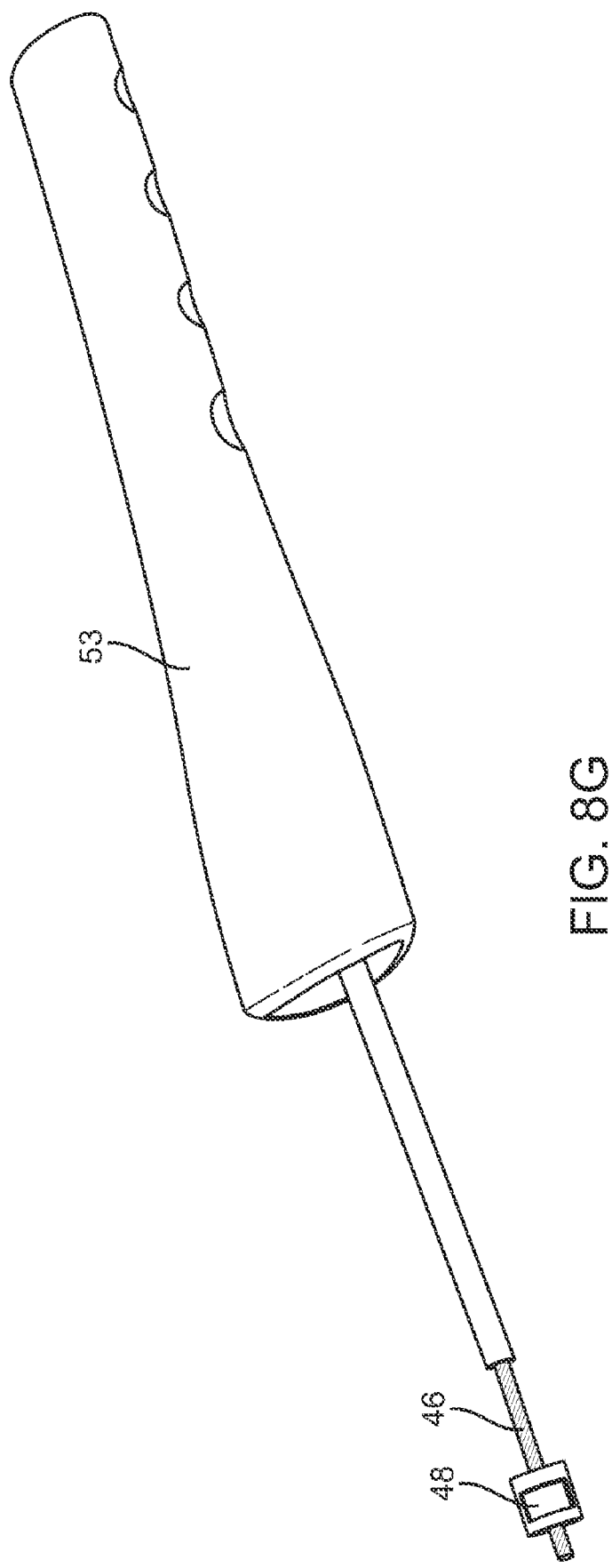
FIG. 8G is a perspective view of a cover for a cable end.
Figure 8H:
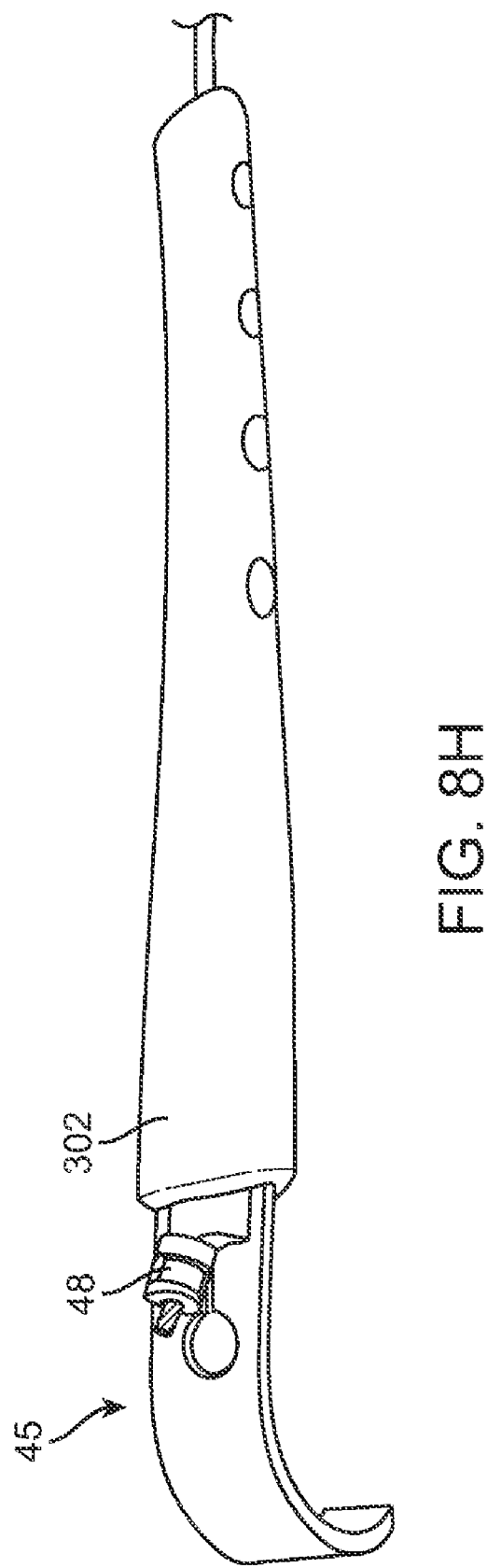
FIG. 8H is a perspective view of a cover for a cable end urged against a hooked end piece.
Figure 81:
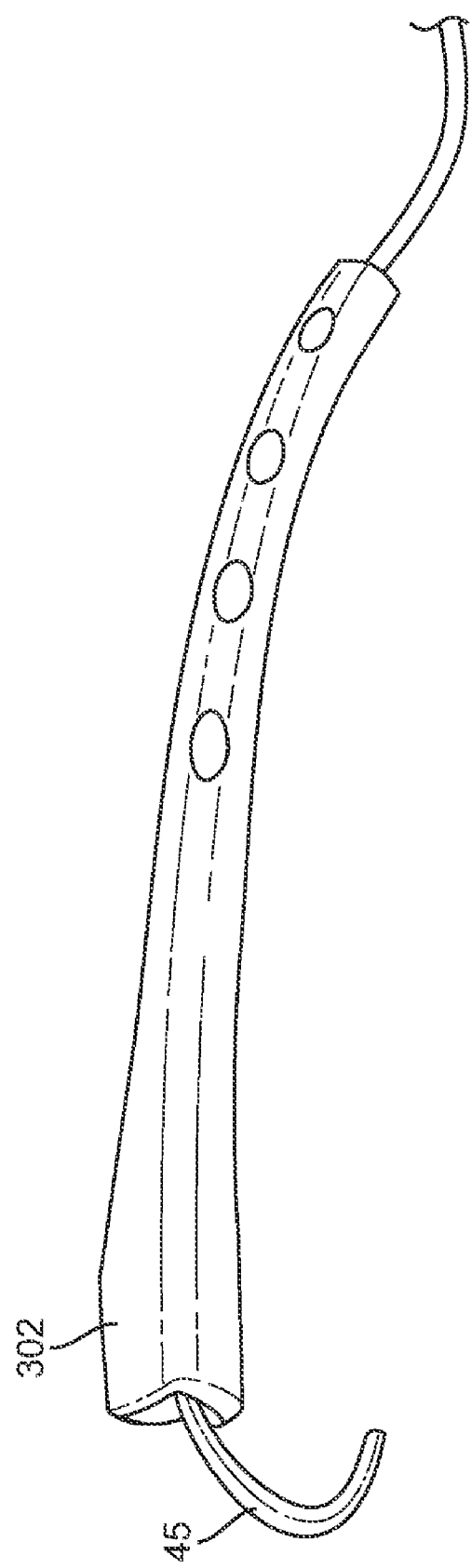

After inserting the cover 53 over the blocker piece 48, the cover 53 can be pulled fully past the blocker piece 48 so as to slide along the flexible cable 46 as shown in FIG. 8G. After insertion of the cover 53 past the block piece 48, then the hooked end piece 45 can be attached as described previously with reference to FIGS. 7 to 8B. After attachment of the hooked end piece 45, the cover 53 can be moved up to the hooked end piece 45 as shown in 8H. The broad end 302 has an aperture 302A which is sized to receive and enclose the blocker piece 48 and a portion of the hooked end piece 45. Accordingly, as shown in FIG. 8I, the cover 53 can be inserted over a portion of the hooked end piece 45. In this way, the cover 53 aids a user to easily grasp the cables as well as help prevent the hooked end piece from being inadvertently removed from the flexible cable.

Figure 9:
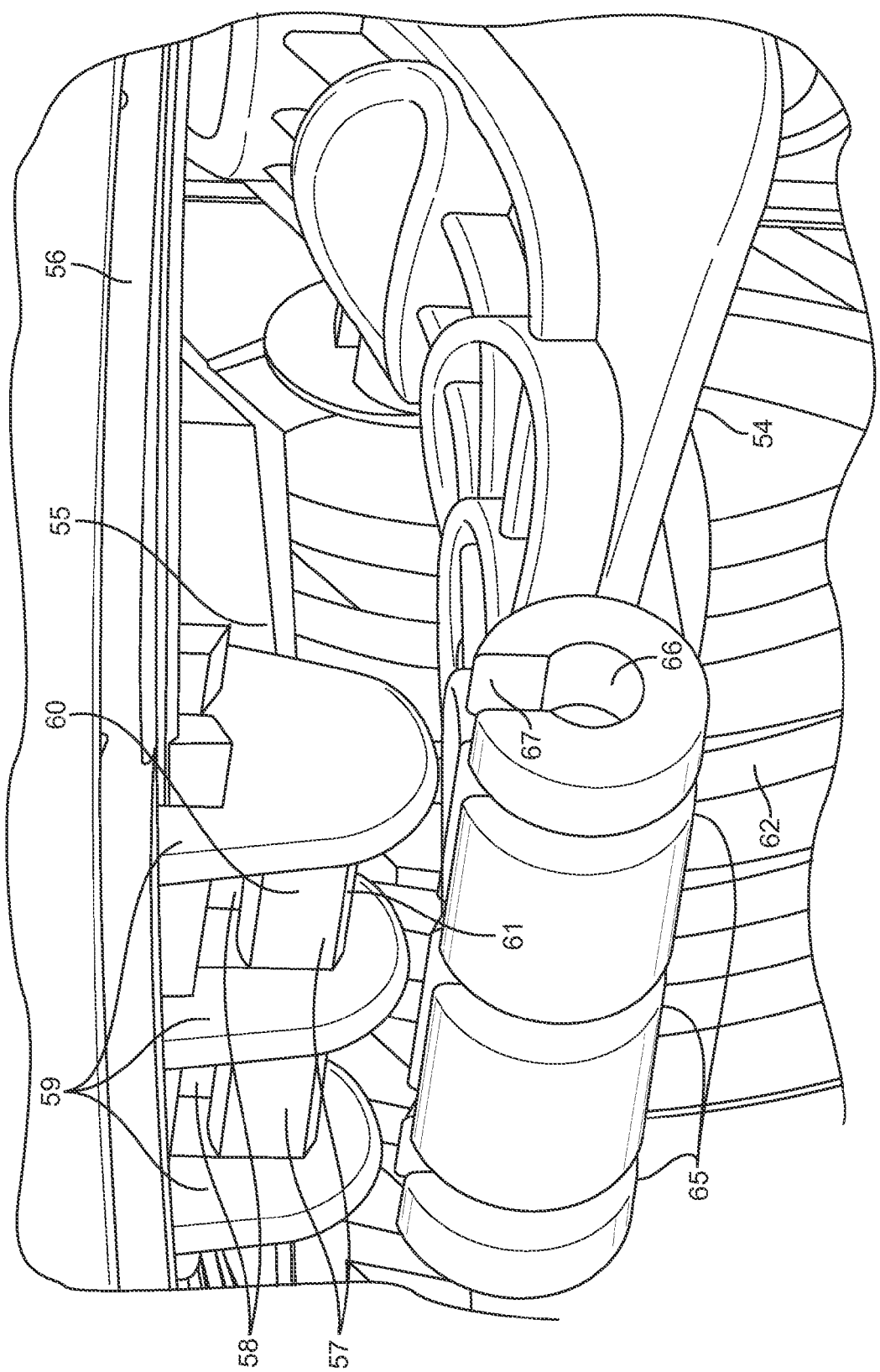
FIG. 9 is a perspective view of one embodiment of an anti-sway arrangement.
Figure 10:
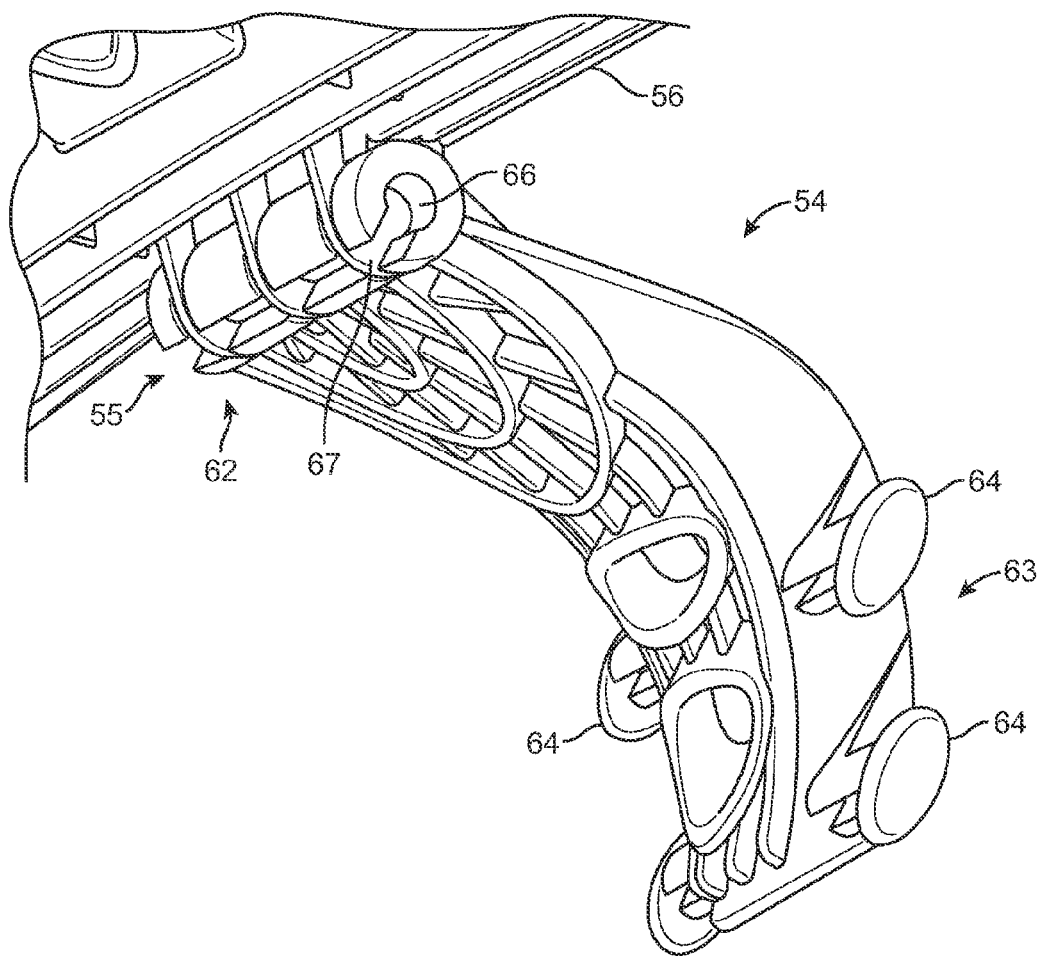
FIG. 10 is a perspective view of one embodiment of an anti-sway arrangement.

Referring now to FIGS. 9 and 10, one embodiment of an anti-sway device 54 is illustrated therein. Anti-sway devices are generally provided beneath bicycle carrier arms and prevent swinging, or "sway," of the bicycle when installed in a rack which may occur when the vehicle is in progress.

As shown in FIG. 10, an anti-sway device 54 is rotatably attached to an attachment member 55 while FIG. 9 shows the anti-sway device 54 detached from the attachment member 55.

As can be seen with reference to FIG. 9, the attachment member 55 protrudes from the underside of a bicycle carrier arm 56. The attachment member 55 extends in the same longitudinal direction as the bicycle arm. The attachment member 55 has locking members 57 suspended a distance from the bicycle arm. In the embodiment shown in FIG. 10, there are spaces 58 between the bicycle arm and the locking members 57. Furthermore, the locking members 57 are connected between three wall protrusions 59. The locking members 57 are shaped such that they are longer in the vertical sides 60 than their horizontal sides 61.

Referring to FIG. 10 the anti-sway device 54 has a corresponding attachment portion 62 and arches to a contact portion 63. This contact portion 63 may abut a bicycle installed in the bicycle rack in order to prevent "sway." It also may be slightly concave to better embrace the tube of a bicycle. Furthermore, tabs 64 are provided onto which a strap may be attached so as to wrap around a portion of a bicycle for better stabilization. Referring to FIG. 9, the attachment portion 62 is of a longitudinal circular shape divided into several segments separated by apertures 65. The attachment portion 62 further has a central axis aperture 66 extending along its length. Additionally, there are openings 67 on the side of the attachment portion 62 which act as an entrance channel for the central aperture 66.

The openings 67 are positioned such that only when the anti-sway device is oriented substantially horizontal can the attachment portion 62 of the anti-sway device be inserted onto the locking members 57. The openings 67 are shaped such that they can receive the locking members 57 only when they are oriented substantially horizontal. The openings 67 are additionally sized such that they can receive the horizontal sides 61 of the locking members 57. In some embodiments, the openings 67 may simply be larger than the horizontal sides 61 so as to easily fit onto the locking members 57, however, this can include a press-fit where the horizontal sides 61 are just slightly larger than the openings 67 so that when pressed they will force over the horizontal sides 61 and fit onto the locking members 61. However, the vertical sides 60 of the locking member 57 are longer than the horizontal sides, and are sized to exceed the dimensions of the openings 67. Thus to attach the anti-sway device 54, it must be oriented horizontally with the openings 67 aligned with the locking horizontal sides 61 of locking members 57.

Figure 9A:
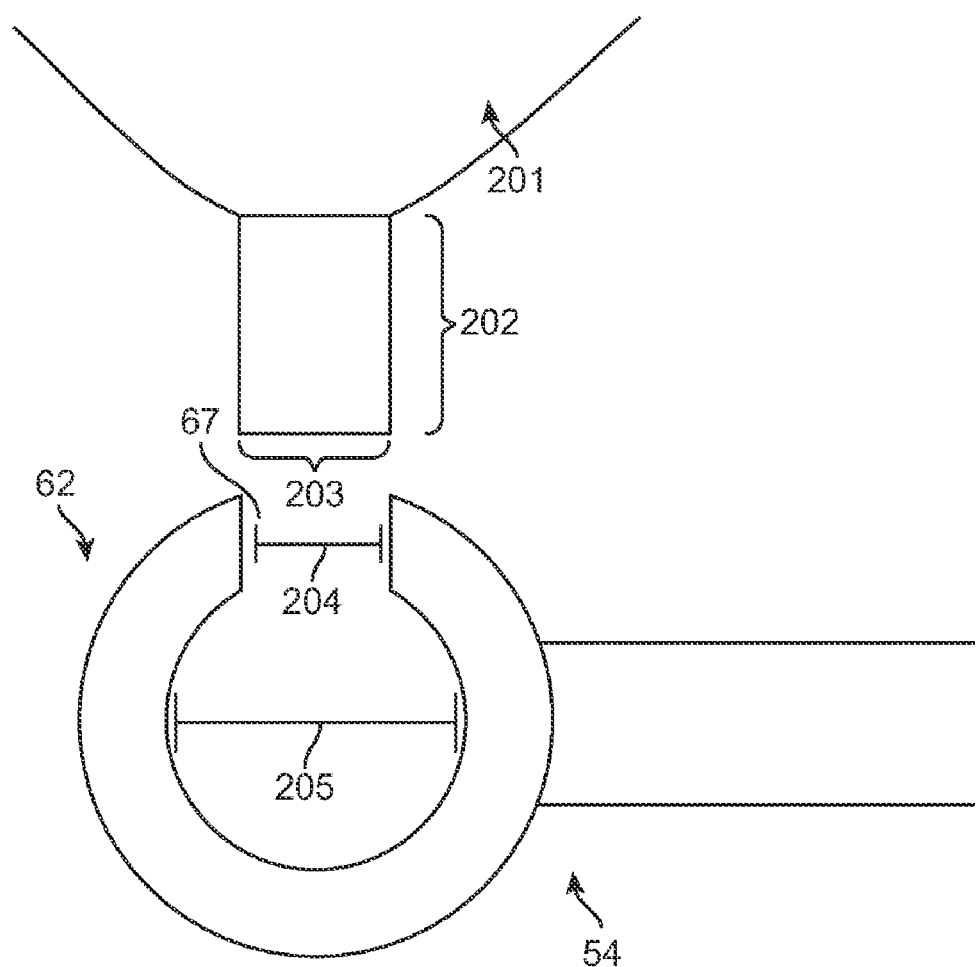
FIG. 9A is a cross-sectional view of one embodiment of an anti-sway arrangement.

The respective sizing of the openings 67 and the locking members 57 may also be described in terms of cross-section. For example, illustrated in FIG. 9A is a cross-sectional view of the locking members 57 and attachment portion 62. The locking members 57 have a narrow cross-section 203 and a broad cross-section 202. The narrow cross section 203 faces a direction perpendicularly downward from the bike carrier 201 to which it is attached, and may also be termed the horizontal side. The broad cross-section 202 as can be seen faces a direction parallel to the bicycle carrier, and may also be termed the vertical side. Additionally shown in FIG. 9A (not drawn to scale) is locking members 57 with cross-sectional diameter 205 of the central aperture of the attachment portion 62. Also shown is the cross sectional size 204 of openings 67. As can be seen, the thickness of the narrow cross-section 203 is such that the cross-sectional size 204 of openings 67 may fit over the locking members 67 in order to insert or remove the attachment portion 62 from the locking members 57. Additionally, the thickness of broad cross section 202 is greater than the cross-sectional distance of openings 67 and thus cannot fit over the locking members 57 from this direction. Accordingly, when the anti-sway device 54 is oriented horizontally, the openings 67 are aligned with the narrow cross section 203 of the locking members 57 and thus may be inserted onto or removed from the locking members 57. However, when the anti-sway device 54 is oriented vertically or non-horizontally, the openings 67 are not aligned with the narrow cross-section 203 but instead face the broad cross-section 202. Additionally, the cross-section 205 of the central aperture will be such that it is greater than the broad cross-section 202, thus allowing rotation of the anti-sway device when attached to the locking members 57.

Furthermore, as shown in FIGS. 9, 9A, and 10, the openings 67 may also be described as opening to a right angle with respect to the extended body portion of the anti-sway device 54. For example, in FIG. 9A, when the anti-sway device 54 is oriented essentially horizontally, the openings 67 face directly in an upward direction and thus may be inserted over the narrow cross-section 203. However, when oriented vertically or non-horizontal, the openings 67 will not be aligned with the narrow cross-section 203 and so will not be insertable or removable from the locking members 57. This "C" shape of the central aperture and openings in the attachment portion of the anti-sway device enable it to be easily inserted, removed and rotated to an engaged position to prevent sway of the bicycle.

Once the anti-sway device 54 is inserted, it can then be rotated from the horizontal position about the central axis aperture 66. When the device is no longer in the horizontal position such as in FIG. 10, the openings 67 will no longer be aligned with the horizontal sides 61 of the locking members 57, but instead will face the vertical sides 60. Because the vertical sides 60 exceed the dimensions of the openings 67, the anti-sway device cannot be disengaged from the locking member 64 when not oriented horizontally. For example, FIG. 10 illustrates an embodiment where the anti-sway device is not oriented in the horizontal position, but closer to vertical. Accordingly, when the anti-sway device is not in the horizontal position, but oriented more vertically, it may be used to engage a bicycle tube to aid in preventing "sway." When the anti-sway device is oriented in substantially horizontal position it is in a non-engaged position, and may be removed from the attachment member 62. Furthermore, although the anti-sway device may be arced outward in some embodiments, it will be understood that the description of "horizontal" and "vertical" are in relation to the portion immediately extending from the attachment portion 62 and their orientation relative the locking members 57 and bicycle rack arm.

The respective sizing of the openings 67 and the locking members 57 may also be described in terms of cross-section. For example, illustrated in FIG. 9A is a cross-sectional view of the locking members 57 and attachment portion 62. The locking members 57 have a narrow cross-section 203 and a broad cross-section 202. The narrow cross section 203 faces a direction perpendicularly downward from the bike carrier 201 to which it is attached, and may also be termed the horizontal side. The broad cross-section 202 as can be seen faces a direction parallel to the bicycle carrier, and may also be termed the vertical side. Additionally shown in FIG. 9A (not drawn to scale) is locking members 57 with cross-sectional diameter 205 of the central aperture of the attachment portion 62. Also shown is the cross sectional size 204 of openings 67. As can be seen, the thickness of the narrow cross-section 203 is such that the cross-sectional size 204 of openings 67 may fit over the locking members 57 in order to insert or remove the attachment portion 62 from the locking members 57. Additionally, the thickness of broad cross section 202 is greater than the cross-sectional distance of openings 67 and thus cannot fit over the locking members 57 from this direction. Accordingly, when the anti-sway device 54 is oriented horizontally, the openings 67 are aligned with the narrow cross section 203 of the locking members 57 and thus may be inserted onto or removed from the locking members 57. However, when the anti-sway device 54 is oriented vertically or non-horizontally, the openings 67 are not aligned with the narrow cross-section 203 but instead face the broad cross-section 202. Additionally, the cross-section 205 of the central aperture is such that it is greater than the broad cross-section 202, thus allowing rotation of the anti-sway device when attached to the locking members 57.

Furthermore, as shown in FIGS. 9, 9A, and 10, the openings 67 may also be described as opening to at about a right angle (90 degrees) with respect to the extended body portion of the anti-sway device 54. For example, in FIG. 9A, when the anti-sway device 54 is oriented essentially horizontally, the openings 67 face directly in an upward direction and thus may be inserted over the narrow cross-section 203. However, when oriented vertically or non-horizontal, the openings 67 will not be aligned with the narrow cross-section 203 and so will not be insertable or removable from the locking members 57. This "C" shape of the central aperture and openings in the attachment portion of the anti-sway device enable it to be easily inserted, removed and rotated to an engaged position to prevent sway of the bicycle. In other embodiments, the opening may be less than 90 degrees such that the anti-sway device would be rotated above and past the horizontal position to be released.

Figure 10A:
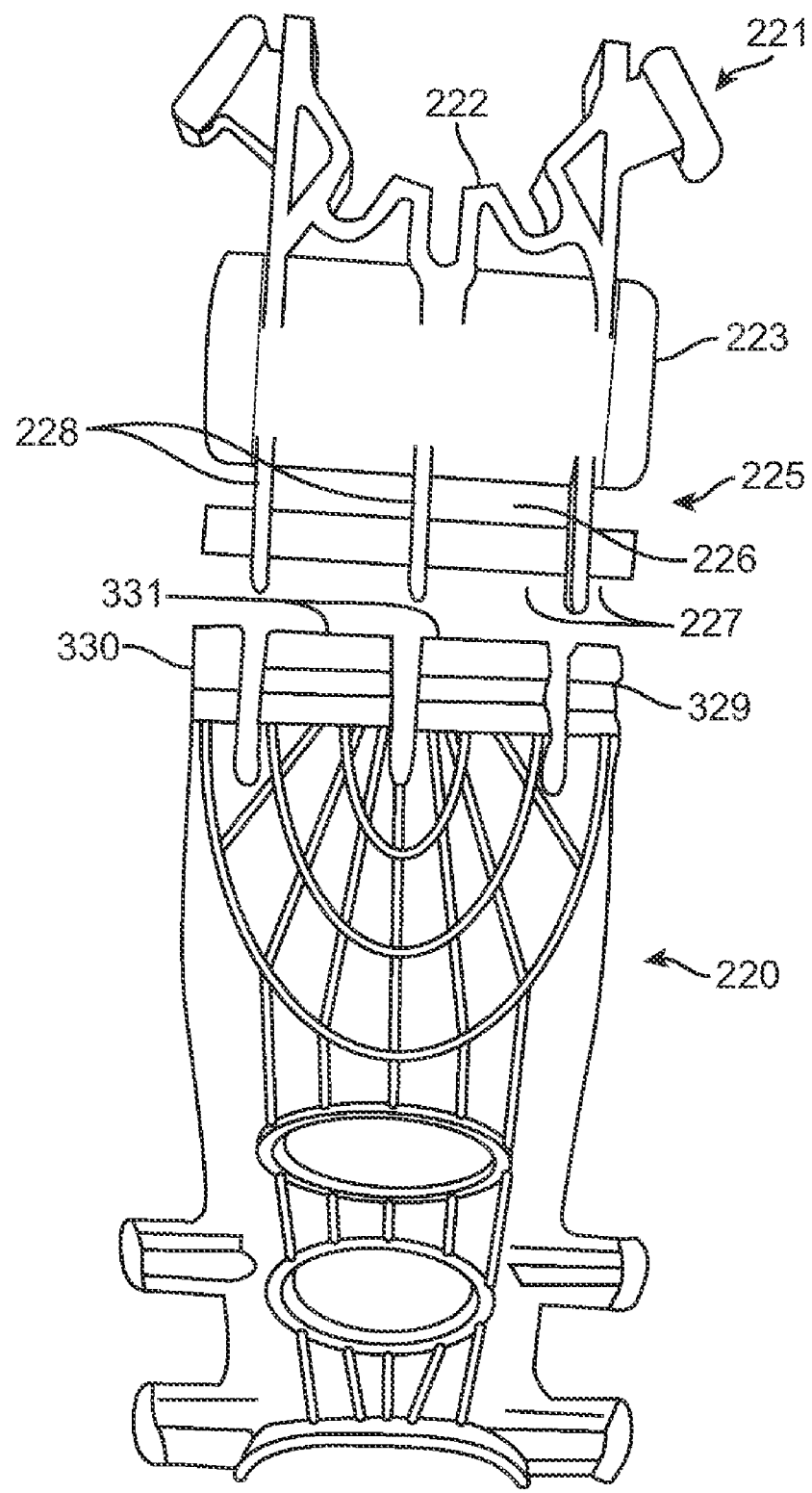
FIG. 10A is a side view of one embodiment of an anti-sway arrangement and cradle piece.
Figure 10B:
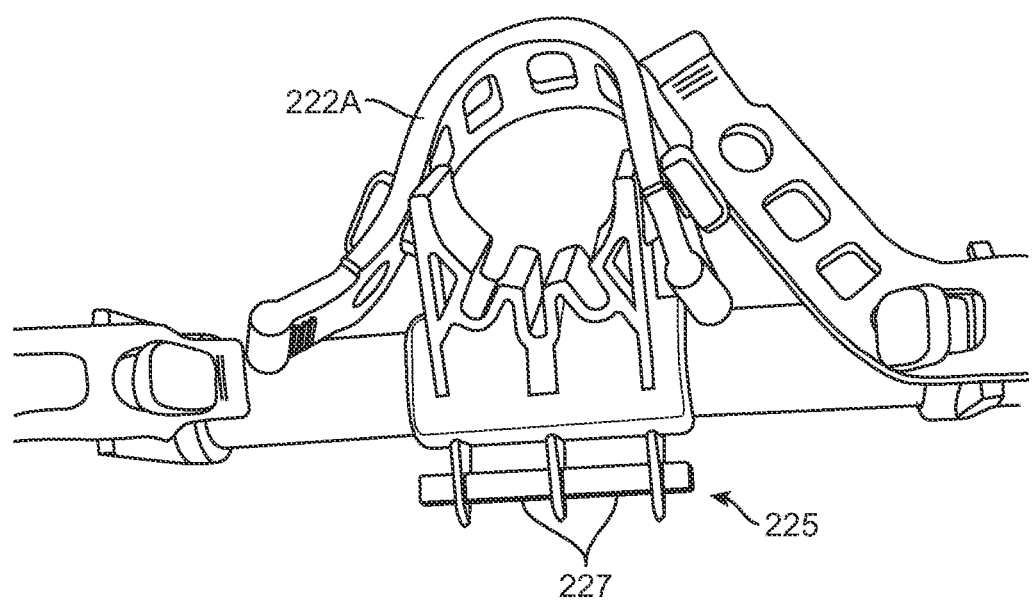
FIG. 10B is a perspective view of one embodiment of an anti-sway arrangement and cradle piece inserted on a bicycle rack arm.
Figure 10C:
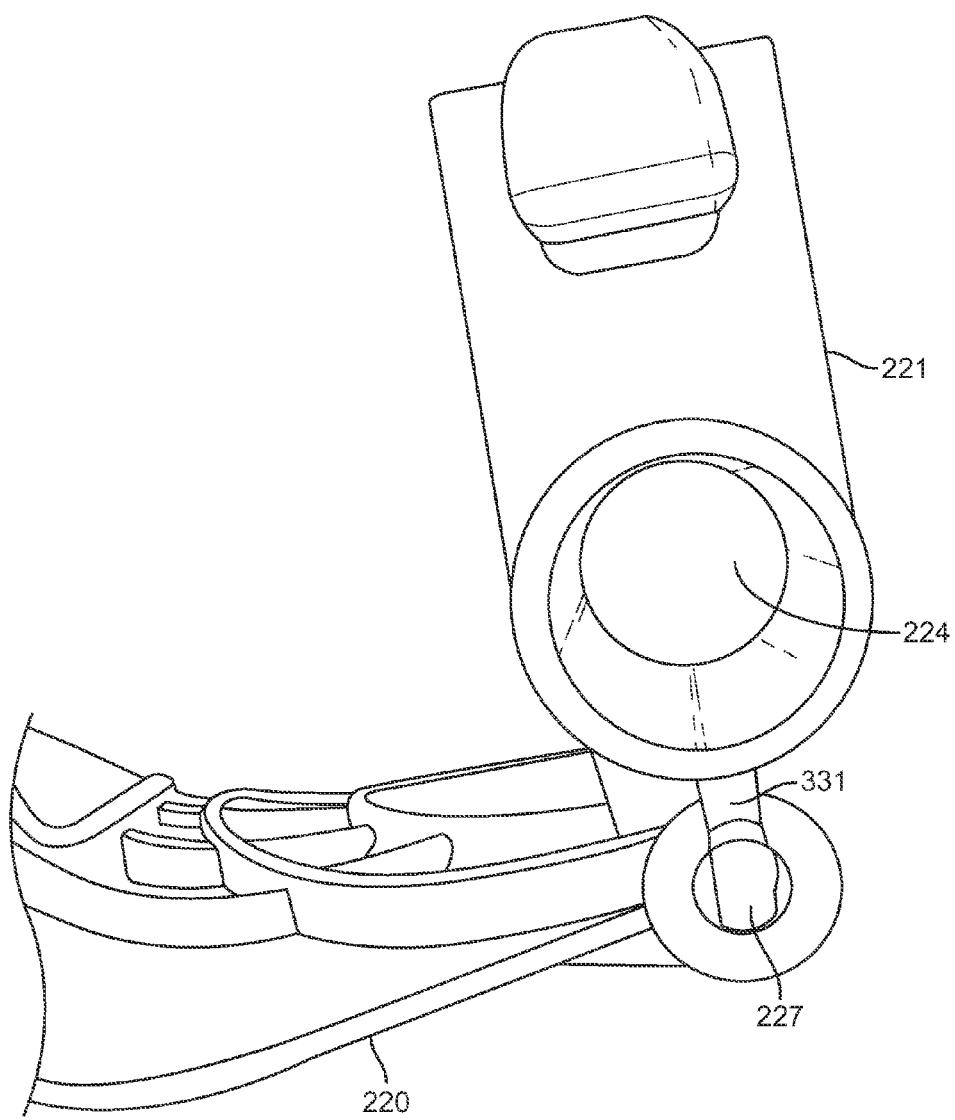
FIG. 10C is a side view of one embodiment of an anti-sway arrangement and cradle piece.

Furthermore in other embodiments, as shown in FIG. 10A an anti-sway device 220 may be attachable to a removable cradle piece 221. For example, the cradle piece 221 may have a saddle portion 222 as well as a bicycle rack arm receiving portion 223. The saddle portion may receive a bicycle tube or may additional have some padding thereon. Furthermore, the bicycle rack arm receiving portion 223. As can be seen in FIG. 10C, the arm receiving portion 223 has a hollow 224 for receiving a bicycle rack arm. In many conventional bicycle racks, the cradles are not built into the bicycle rack, and thus cradles are separably added. Thus the hollow 224 may be inserted over a bicycle rack arm for installing thereon as shown in FIG. 10B. Additionally a strap 222A can be seen attached to the cradle piece 221.

The cradle piece 221 has an attachment member 225 extending in the same longitudinal direction as the body of the cradle piece 221. The attachment member 225 has a locking members 227 suspended a distance from the cradle piece 221. There are spaces 226 between the bicycle arm and the locking members 227. Furthermore, the locking members 227 are connected between three wall protrusions 228. The anti-sway device 220 has an attachment portion 329 with a central axis aperture 330 and openings 332. The locking members 227 are shaped such that they are longer in the vertical sides than their horizontal sides as similarly described with respect to the locking members 57 in FIGS. 9 and 10. The respective sizing of the openings 332 and the locking members 227 may also be described in terms of cross-section with a broad and narrow cross-section as described with respect to FIG. 9A. Additionally, the openings 332 may also be described as opening to a right angle with respect to the extended body portion of the anti-sway device 220.

Figure 10D:
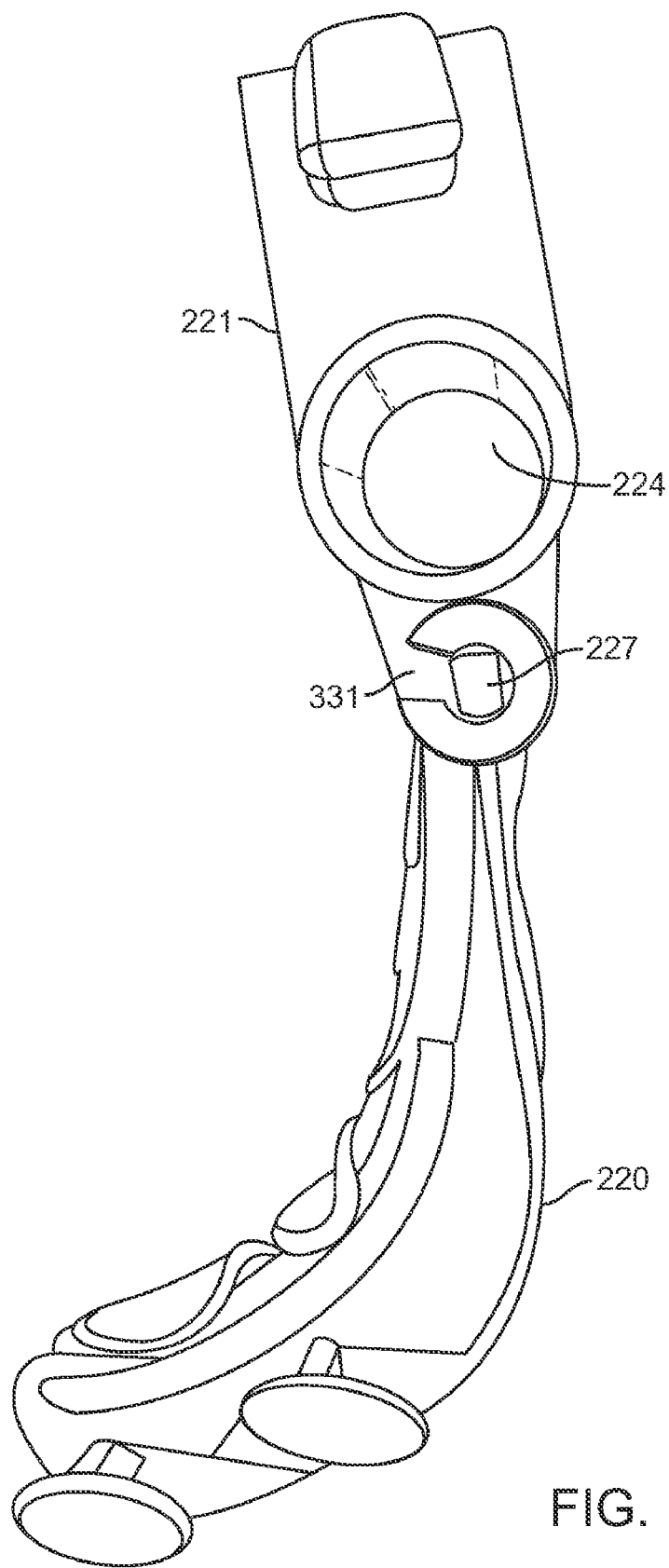
FIG. 10D is a side view of one embodiment of an anti-sway arrangement and cradle piece.
Figure 10E:
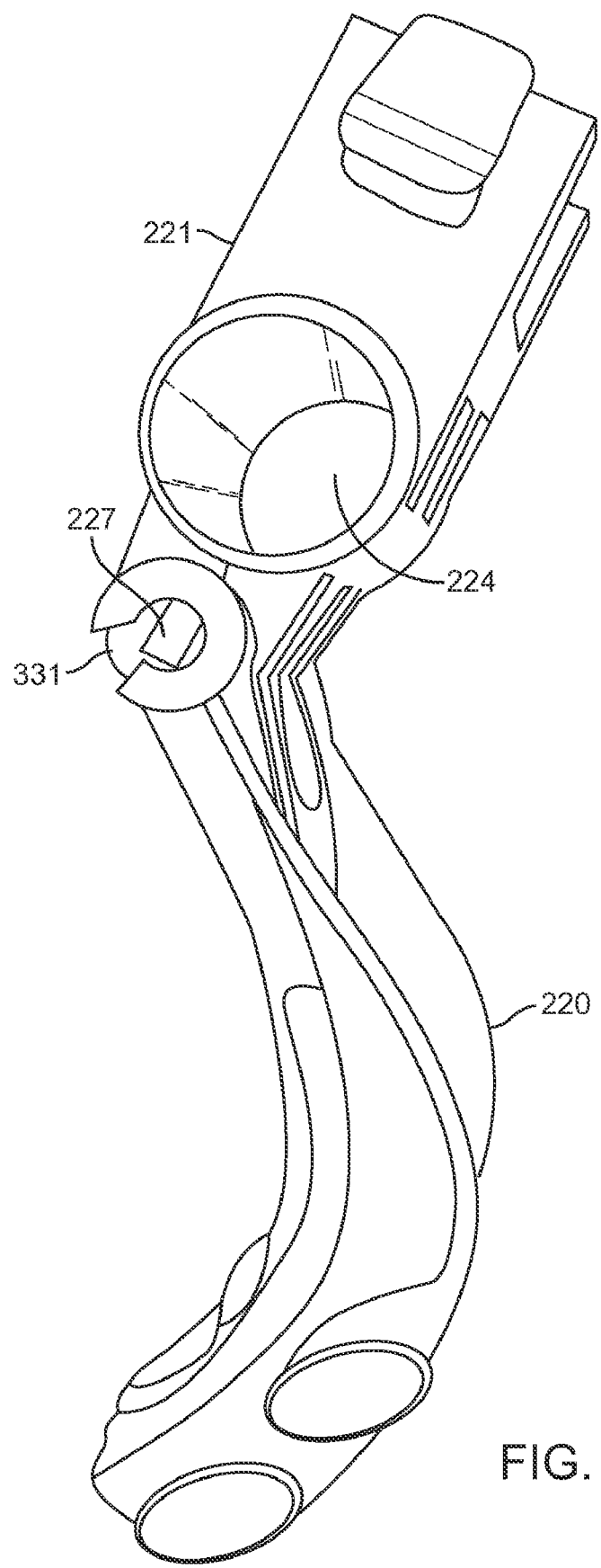
FIG. 10E is a side view of one embodiment of an anti-sway arrangement and cradle piece.

Now referring to FIGS. 10C to 10E, there is shown rotation of anti-sway device 220 on locking members 227. As shown in FIG. 10C, the anti-sway device 220 is rotated essentially horizontal. Accordingly, the openings 331 are aligned with the narrow cross-section of the locking members 227 such that it may be removed from attachment to the cradle piece 221. As shown in FIG. 10D, the anti-sway device 220 is rotated to be essentially vertical, and thus in an engaged position (although the end portion arcs away from the vertical). Accordingly, the openings 221 are not aligned with the narrow cross section of the locking members 227. Thus, the anti-sway device 220 cannot be removed from the cradle piece 221. Furthermore, as shown in FIG. 10E, the anti-sway device 220 is rotated between the horizontal and vertical positions. However, because the anti-sway device 220 is not in the horizontal non-engaged position, the openings 331 are still not aligned with the narrow cross section of the locking members 227. Thus, even in this configuration, the anti-sway device 220 cannot be removed from the cradle piece 221.

Figure 11:
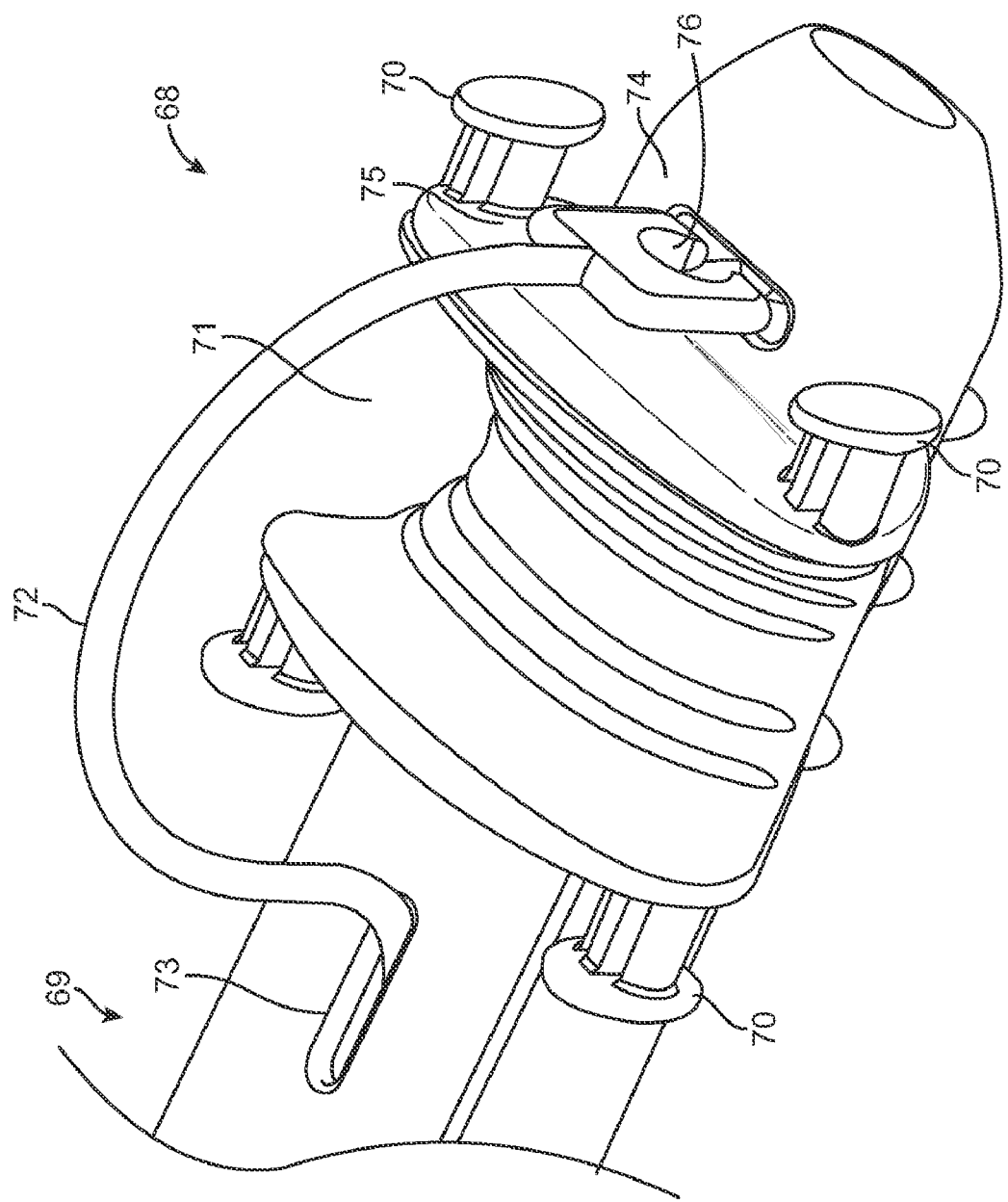
FIG. 11 is a perspective view of one embodiment of a cradle and locking cable.
Figure 12:
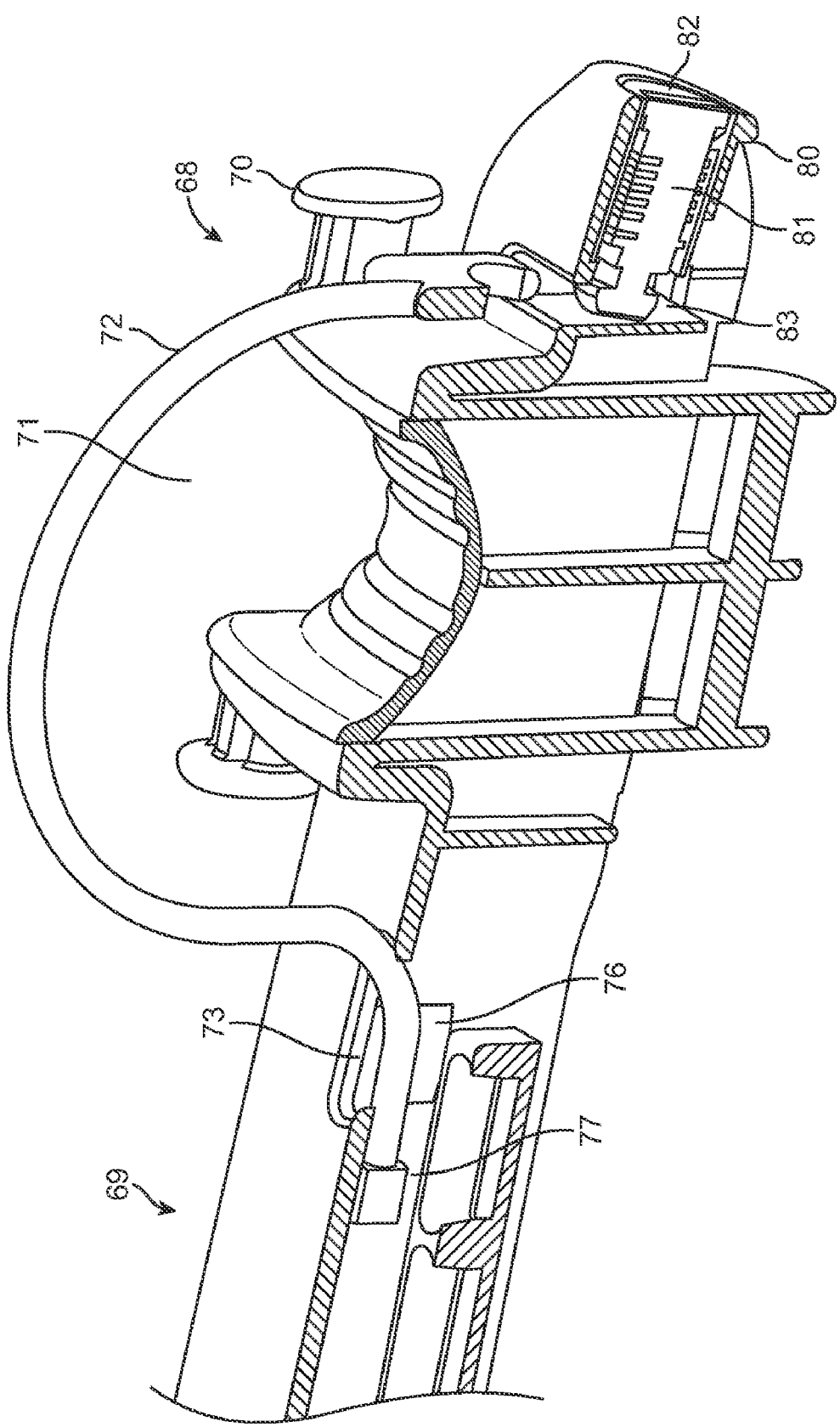
FIG. 12 is a cross-sectional view of one embodiment of a cradle and locking cable.

Referring now to FIGS. 11 and 12, one embodiment of an integrated cable lock is illustrated therein. The lock as illustrated, for example, in FIGS. 11 and 12 enable the securement of the bicycle installed at the end of the bicycle carrier arm. For securement of all the bicycles on a rack arrangement, only the end bicycle need be locked because removal of the other bicycles are prevented. Depicted in FIG. 11 is an end cradle 68 integrated with the bicycle arm 69 and having tabs 70 capable of receiving a strap (not shown). The cradle has a concave trough 71 which is shaped for receiving a bicycle tube.

Further depicted is a locking cable 72 extending from an aperture 73 in the surface of the top portion of the bicycle arm 69. The locking cable can be manually withdrawn from the aperture 73 or retracted therein. A locking cavity 74 is provided on the other side of the cradle 68, which contained therein is a locking mechanism. The end of locking cable 72 has a locking end piece 75 made up of a rigid, preferably metal planar tab with a circular aperture 76 which opens to the lower edge of the tab.

Shown in FIG. 12 is a cross-sectional view of the cable lock embodiment shown in FIG. 9. As shown therein the locking cable 72 extends through aperture 73 into a containment space 76 and attached at its end to an anchor 77 beneath the bicycle carrier surface. The locking cable can be retracted and stored in the containment space 76. The locking end 74 can be shaped in such away as to substantially cover the aperture 73 when the locking cable is fully retracted. In other embodiments, the anchor 77 may be provided in a channel such that it may be pushed back if the locking cable is retracted. Additionally, a spring may be employed which automatically retracts the locking cable 72.

Further illustrated in FIG. 10 is a locking mechanism 80 which has a lock core 81 and a key hole 82. Furthermore, within the locking cavity 74 is the locking head 83 of the lock core. The locking head can be shaped such that it has a narrow on one side, while wide on another. Because the aperture 76 of the locking end piece 75 is circular the opening at the edge of the locking tab will have a lesser width than the center of the aperture. Accordingly, when the locking head is rotated to the un-locked position, the cable can be inserted into the locking cavity so that the aperture 75 receives the locking head 83. Furthermore, the locking head 83 can be rotated in the aperture to a locked position wherein the locking cable is prevented from being removed. It will be understood that many modes and mechanisms may be employed for restricting the cable end 75 in the locking cavity 74.

Figure 1B:
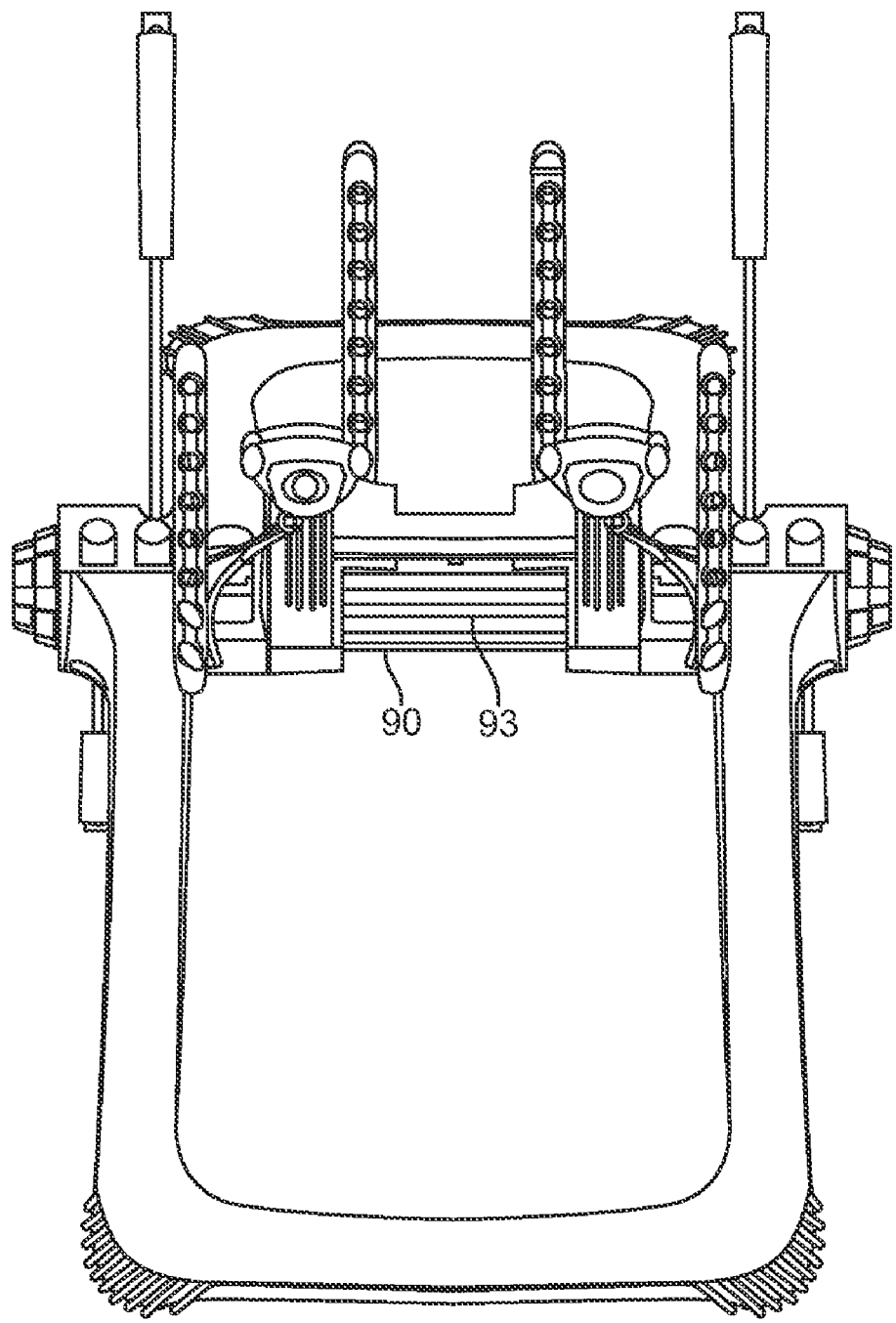
FIG. 1B is a front view of one embodiment of a truck mounted bicycle carrier rack.

Referring back to FIG. 1A, illustrated therein are carrier arms 11, 11', the upper mounting member 4 and lower mounting member 5 which are connectable about hub 15. Around this hub the bicycle arms 11, 11' and upper mounting member 4 are rotatable. FIG. 1B, which is a front view from behind the vehicle looking forward as the carrier 1 is mounted to the vehicle) of the carrier 1, illustrates that the hub 15 has an elongate member 90 passing through apertures in the bicycle arms 11, 11' and upper mounting member 4. Elongate member 90 has a plurality of teeth on running along its length on the external surface, hence, it may also be described as a splined shaft member.

Figure 13:
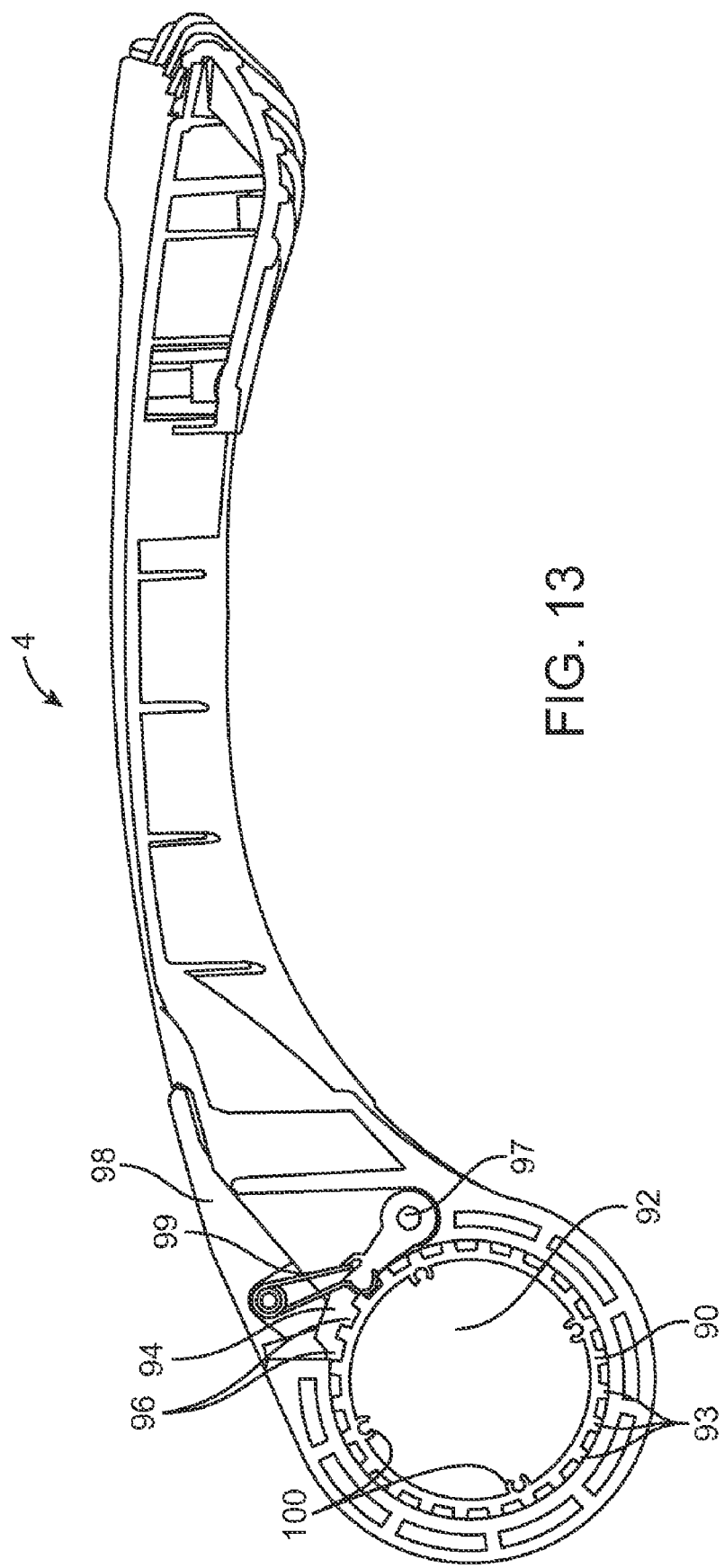
FIG. 13 is a cross-sectional view of one embodiment of an upper mounting member.

Illustrated in FIG. 13 is a cross-sectional view of an upper mounting member 4 having an upper mounting aperture 92. Within aperture 92 is elongate member 90 having splines, or teeth 93. The teeth 93 extend outward and contact the inner surface of the aperture 92. A latch 94 is provided having a set of teeth 96 corresponding to the teeth on elongate member 90 and which is rotatable about pivot 97. A lever 98 is provided on the top surface of the upper mounting member 4 which is linked to the latch 94 by pin 99. As shown in FIG. 13, the latch 94 is in a locked position and interferingly fitted and engaged against the teeth 93 on elongate member 90. In such position, the upper mounting member 4 is prevented from rotating about elongate member 90. However, a user can pull lever 98, accordingly pulling latch 94 thereby suspending the latch 94 away from the teeth on elongate member 90. Accordingly, this can be termed the unlocked or released position, because in this configuration the upper mounting arm 4 is rotatable around elongate member 90. Furthermore, the pin 99 is biased (spring loaded), by a spring for example, such that when the lever is released, the spring will cause the lever 98 to close and again urge the latch 94 against the teeth of elongate member 90 thereby locking it in place.

Figure 14:
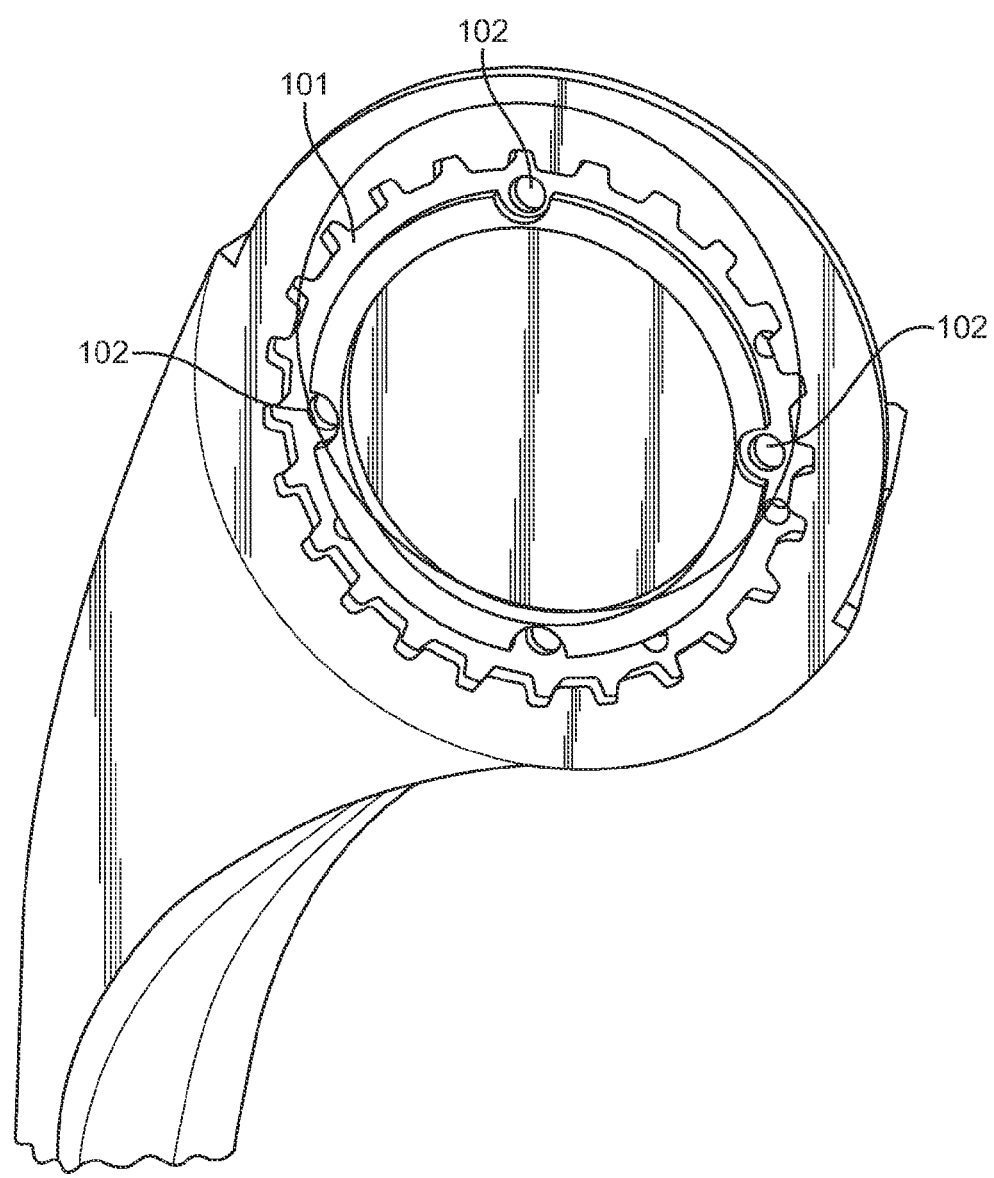
FIG. 14 is one embodiment of an inner surface of a lower mounting member.

Further depicted in FIG. 13 are four fastening holes 100 that are positioned on the internal surface of the elongate member 90. It will be understood by those of skill in the art that a greater or fewer number of fastening holes 100 can be employed. To these fastening holes the lower mounting member 4 can be attached. Illustrated FIG. 14 is an inner surface of a lower mounting member 5. Into the surface is an impression 101 in the shape of the elongate member 90. Accordingly, the elongate member 90 (shown in FIG. 13) can be snugly fit into this impression 101. Additionally, fasteners, such as screws, bolts or pins, may be passed through apertures 102 which are aligned with the fastening holes 100 of the elongate member 90. Accordingly, when the elongate member is inserted into impression 101 and fastened by use of the fastening holes 100 and apertures 102, the lower mounting member 5 is fixed with respect to the elongate member 90, allowing no movement or rotation relative one another. Therefore, while the lower mounting member 5 is fixed relative the elongate member 90, the upper mounting member 4 as well as the bicycle arms 11, 11' are rotatable with respect to the elongate member 30. By rotation of the upper mounting member, along with proper fixing of the bicycle arms 11, 11', the rack arrangement can be made to fit a multitude of vehicles and shapes for mounting thereon. The bicycle arms 11, 11' may be rotated using a similar mechanism as described in FIG. 13 with respect to upper mounting member 4. Accordingly, a user pulling lever 105 (shown in FIG. 1A) will release the bicycle arms 11, 11' for rotation about hub 15.

Figure 15:
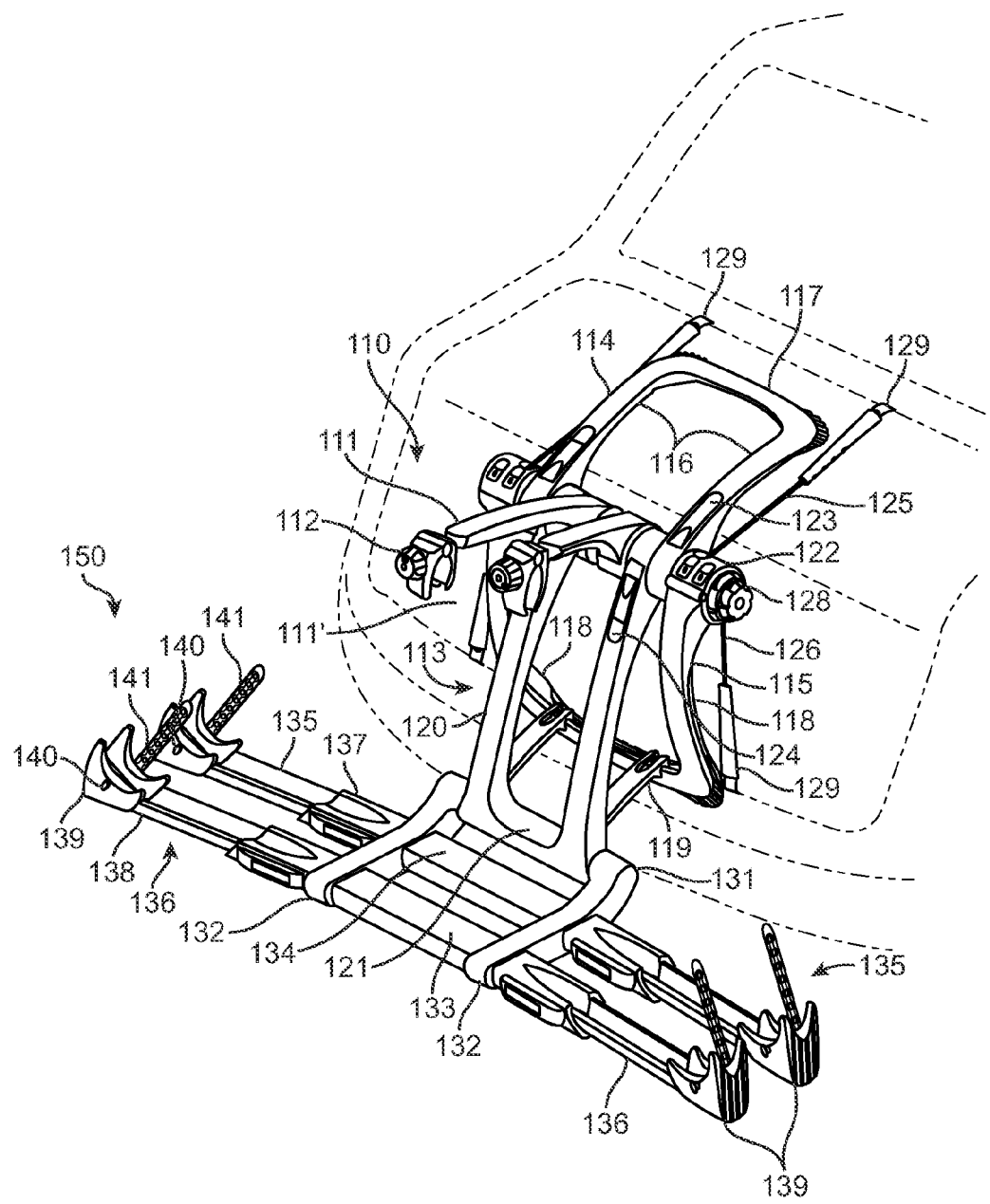
FIG. 15 is a perspective view of one embodiment of a platform bicycle carrier.

One exemplary embodiment of a platform bicycle carrier 110 is shown in FIG. 15 which can be mounted on the rear of a vehicle. The rear of the vehicle may include a trunk and a bumper portion.

The carrier 110 includes an upper mounting member 114 and a lower mounting member 115. Upper mounting member 114 is generally U-shaped with a pair of legs 116 interconnected by a cross-member 117. Likewise, lower mounting member 115 is generally U-shaped with a pair of legs 118 interconnected by a cross-member 119. In the depicted embodiment, the upper mounting legs 116 as well as the lower mounting legs 118 may have an curved arching shape as they extend toward the vehicle, thereby facilitating a more secure grip onto the vehicle. The upper mounting member 4 and lower mounting member 5 each have a rubber and/or soft plastic buffering material along the corners and cross-members.

The carrier 110 further includes bicycle support arms 111, 111', also known as overhanging support arms, which project rearward away from the vehicle each having a clamp 112 on each end. The clamps are sized to grasp a bicycle tube installed in the carrier for stabilizing the bicycle and may be tightened. Support frame 113 also extends rearward from the vehicle and in a downward direction. The support frame 113 is generally U-shaped with legs 120 and a cross-member 121 connecting the two legs.

The upper and lower mounting members along with the bicycle arms and support frame are all connectable about a hub 122. The hub 122 has an elongate member passing through apertures in the bicycle support arms 111, 111', the support frame 113 and upper mounting member 114. Elongate member has a plurality of teeth running along its length on the external surface, hence, it may also be described as a splined shaft member. The upper mounting members 114 are rotatable about elongate member in the same manner as described with respect to FIG. 13 for upper mounting member 4, the description of which is equally applicable for carrier 110. Accordingly, latches 123 are depicted in FIG. 1 which may be pulled by a user to place the upper mounting member in an unlocked or released position for rotation. Similarly, support frame member 113 also has a lever and latch mechanism as described with respect to FIG. 13. Accordingly, latches 117 on support frame member 124 may be by a user to place the support frame member in an unlocked or released position for rotation Furthermore lower mounting member 115 is attached to elongate member in the same manner as described with respect to FIG. 14, being equally applicable for carrier 110.

Upper flexible cables 125 and lower flexible cables 126 extend from the ratcheting arrangements 127 and can attach onto a vehicle. The flexible cables may be retracted back into the arrangements 127 by rotation of knobs 128. At the end of the upper cables 125 and lower cables 126 are hooks 129 which hook into portions of a vehicle. Accordingly, the rack 110 may be mounted to a vehicle by the interaction of forces, such that the flexible cables pull the bicycle rack 110 against the vehicle while at the same time mounting members 114 and 115 abut against vehicle. This causes the rack to be stably mounted to the vehicle and carry a bicycled installed thereon.

The ratcheting system as described in FIGS. 2-5 may be employed for retraction and release of the upper and lower cables 125 and 126 the associated description equally applicable for carrier 110. Furthermore, the hooks 129 are attached to upper and lower cables 125 and 126 in the manner as described in FIGS. 7-9, being equally applicable for carrier 110.

Figure 16:
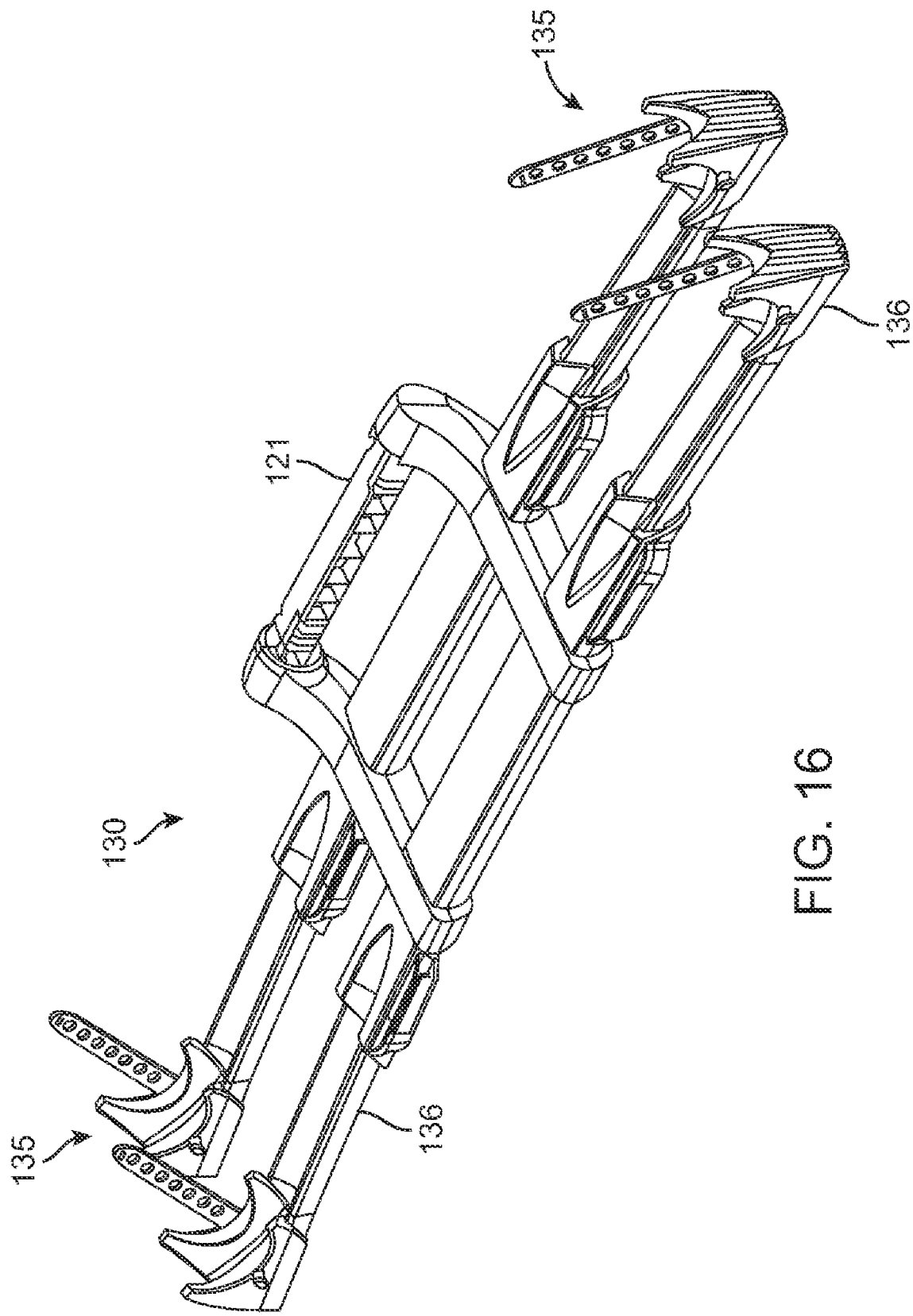
FIG. 16 is a perspective view of one embodiment of platform members in an extended position.

Referring to FIG. 15, support frame 113 has a platform frame member 130 rotatably attached and which extends in a rearward direction. With reference to FIG. 16, the platform frame member 130 has an axial connector 121 which passes through the cross-member 131 of the support frame 113. The platform frame member 130 has two legs 132 which are interconnected by two platform cross-members 133 and 134. Attached to the platform frame member are two platform extension members 135 and 136 extending in a transverse direction from each side of the platform frame member 120. The platform extension members 135 and 136 are aligned in their longitudinal direction with each of the two platform cross-members 133 and 134.

The platform extension members 135 and 136 are made up of an anchor extensions 137 from which support extensions 138 extend. Each support extension member has a concave trough shaped for receiving a bicycle wheel which, as does a portion of the anchor extensions 137. At each end of the support extension members are crib supports 139 which serve to cup the bicycle wheel installed in the rack 101. Moreover tabs 140 are provided along with a strap 141 having a plurality of apertures therein which may be used to secure the bicycle wheel. The support frame along with the platform extension members may together be considered the platform 150 of carrier 110.

Figure 17:
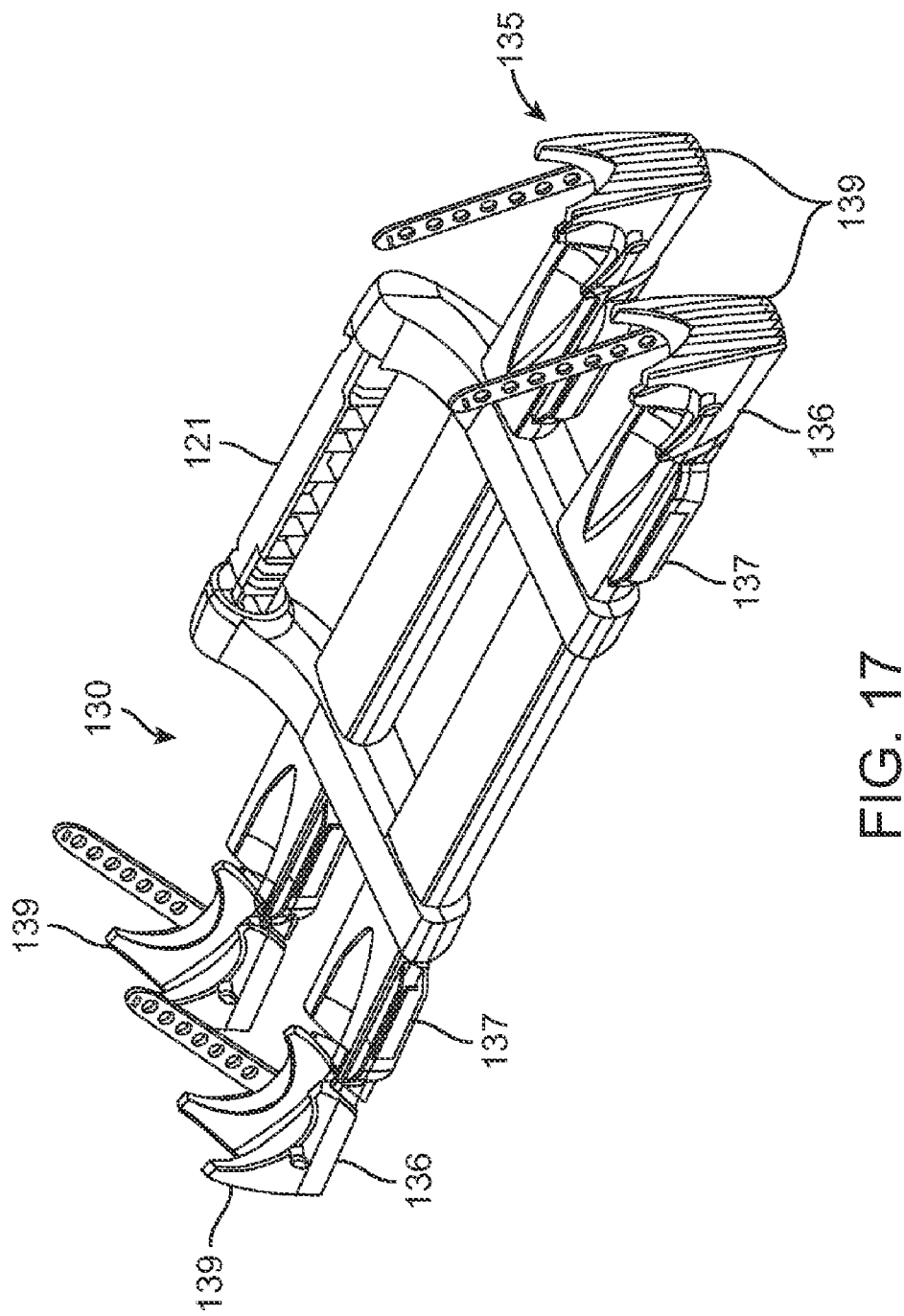
FIG. 17 is a perspective view of one embodiment of platform members in a contracted position.

While FIGS. 15 and 16 illustrate the platform extension members in an extended position, the platform extension members 135 and 136 additionally have a retracted position as depicted in FIG. 17. As shown in FIG. 16, the platform extension members 130 may be withdrawn into the support frame 113 to a refracted position such that the crib supports 139 are brought adjacent to the anchor extensions 137. When a bicycle is not installed in the carrier, a user can place the extension members 130 in retracted position. Additionally, such retracted position facilitates storage as well as shipping of the carrier 110.

Figure 18:
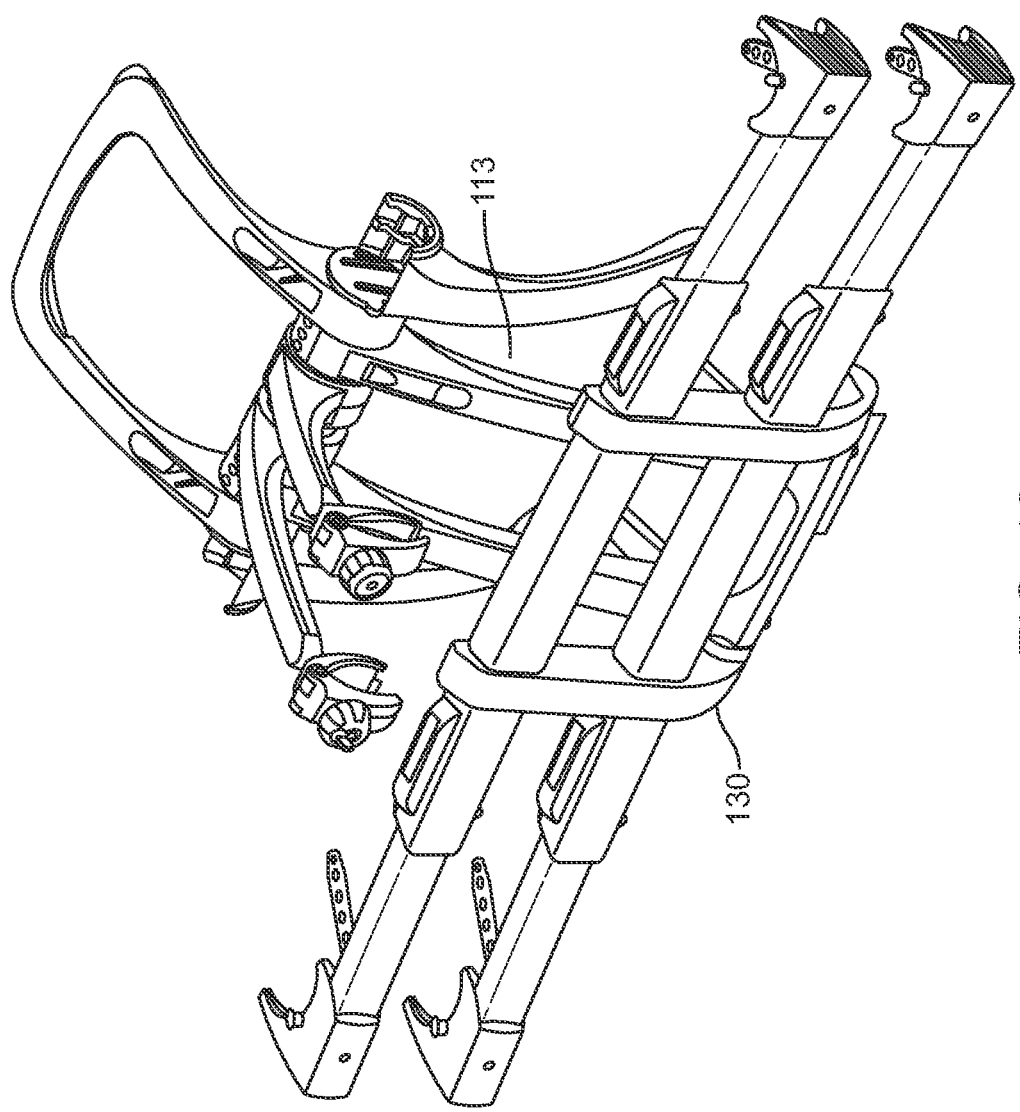
FIG. 18 is an illustration of the platform bicycle carrier in a folded position.

Furthermore the platform 150 may have a folded position and an extended position. While FIG. 15 shows the platform 150 in an extended position, FIG. 18 depicts the platform in a folded position. In the folded position the platform is folded upwards toward the frame support member 113. Side views of the extended and folded positions are also depicted in FIGS. 19 and 20 respectively.

Figure 21:
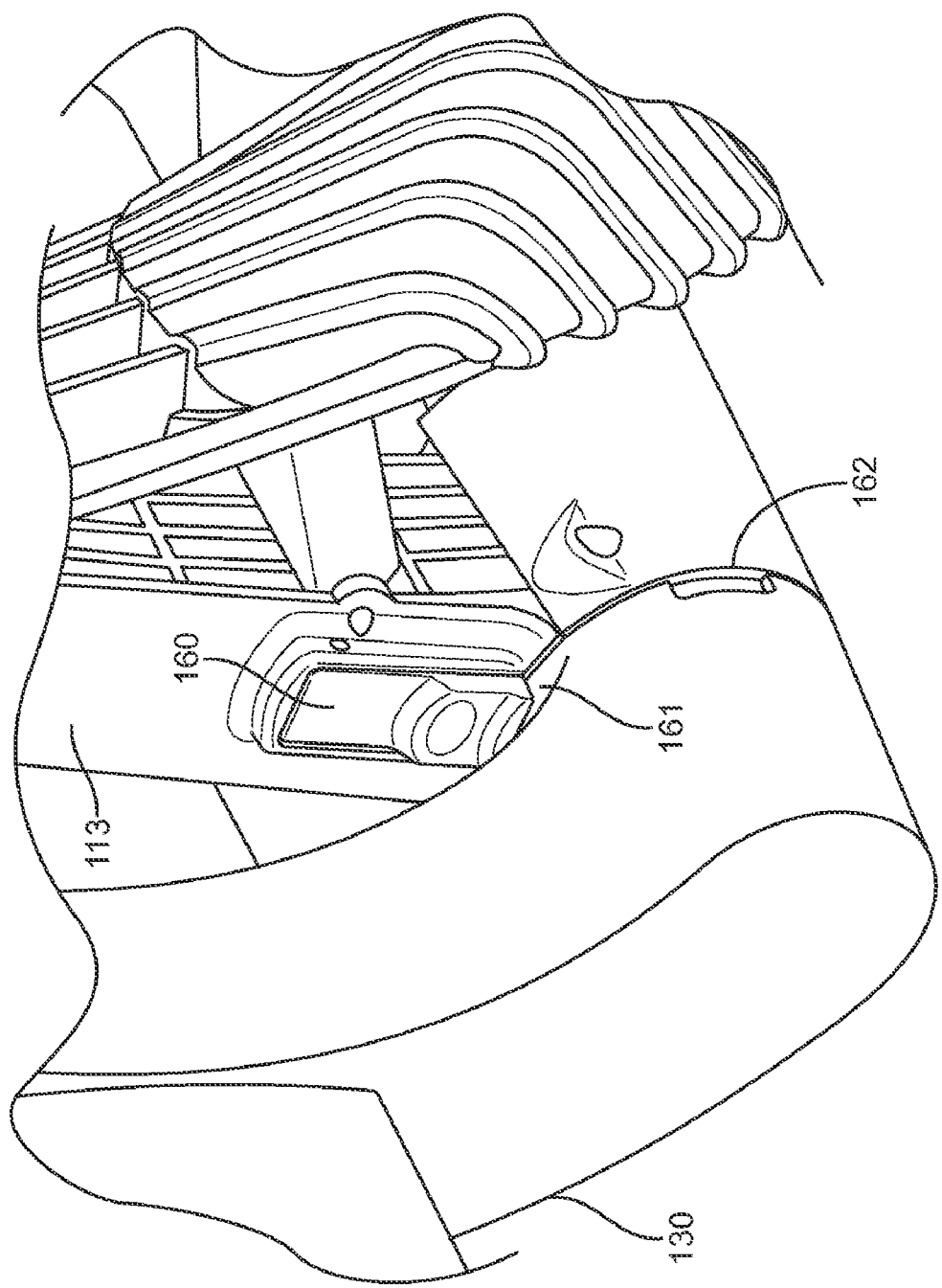
FIG. 21 is a close up view of a support frame and button.

The mechanism for rotating the platform between the extended and folded positions is shown in detail in FIG. 21. As illustrated therein, support frame 113 has a button 160. Additionally shown, platform frame member 130 is rotatably attached to the support frame 113. The platform frame member 130 has two apertures, 161 and 162 separated by about 90 degrees and positioned immediately adjacent the support frame 113. The button 160 contains a spring bias, which urges the button 160 outward toward the platform frame member 130. Accordingly, when the button 160 is aligned with either aperture 161 or 162, it will be urged within aperture thereby preventing rotation between platform frame member 130 and support frame 113. A user can then press the button 160, which pushes it sufficiently far into the support frame 113 to the aperture, thereby allowing free rotation of the frame member 130.

Because the apertures 161 and 162 are positioned such that when the button 160 is inserted into aperture 161, the platform 150 is in a substantially vertical position when in the folded position. As the apertures are separated by about 90 degrees, when the platform frame member is rotated to an extended position, the button 160 will be inserted into aperture 162 and accordingly, the platform 150 will be in an essentially horizontal position. It will be understood by those in the art that in other embodiments, the platform frame member and support frame may be designed to take other positions, the apertures may be separated by more or less than 90 degrees, and furthermore, use of greater than two apertures may be employed.

Figure 19:
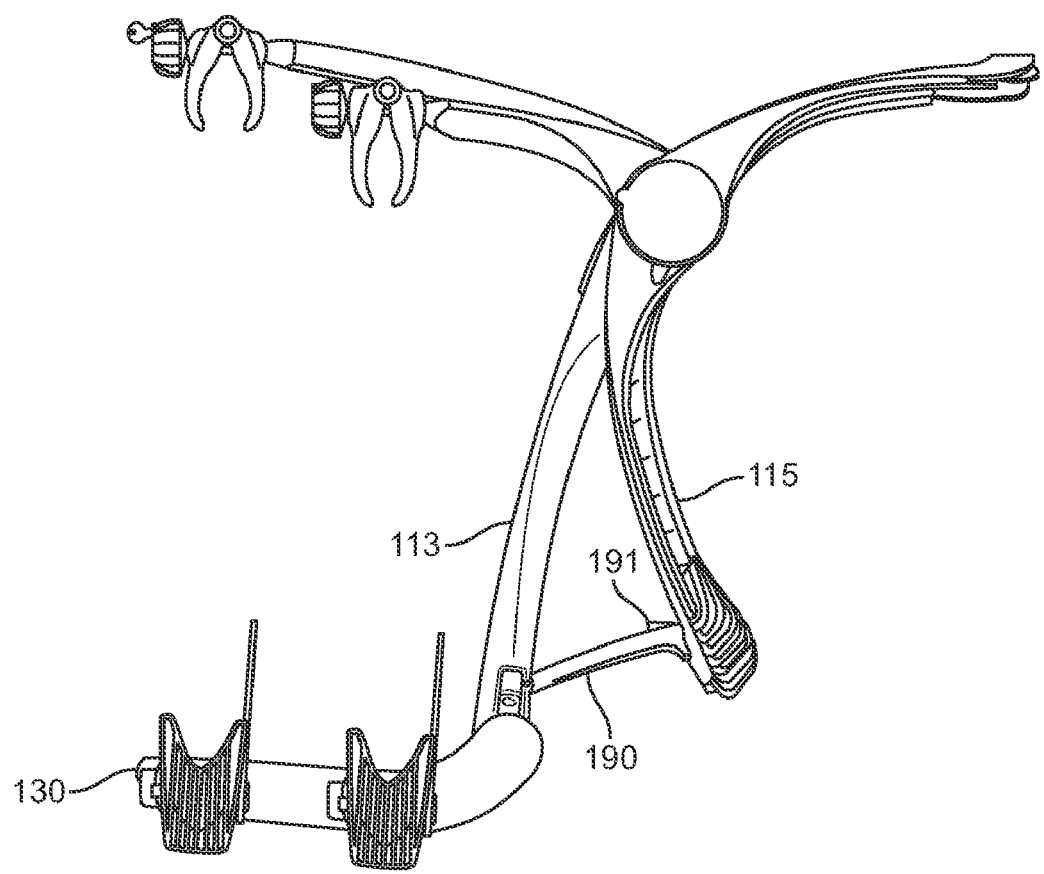
FIG. 19 is a side view of the platform bicycle carrier in an unfolded extended position.
Figure 20:
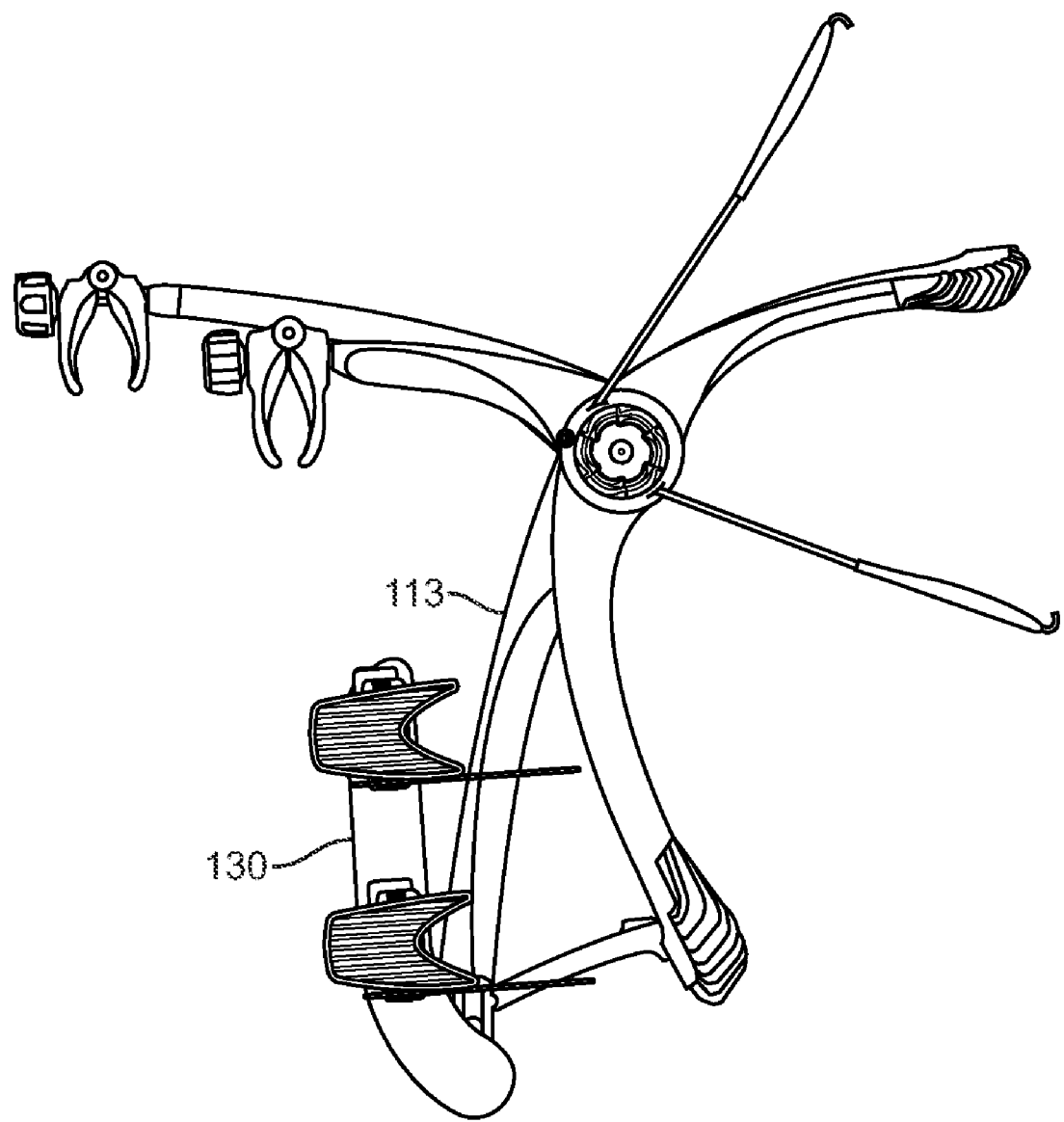
FIG. 20 is a side view of the platform bicycle carrier in a folded position.

Also illustrated in FIG. 19 is a stabilizing cross-section support bridge 190 attached between support frame 113 and lower mounting member 115. The support bridge 190 adds further stability and support to support frame 113. The additional force aids for overall strength of the carrier 110. In one embodiment, the support bridge 190 may be detached from lower mounting member 115 by pressing a button 191. In such embodiment, support bridge 190 is pivotally attached to lower frame member 113 and so will swing freely after such release. In this way, the carrier 110 can be folded by rotating support frame 113 in line with lower mounting member 115 so that it takes up less space in a trunk or for shipping. In other embodiments, the reverse may be implemented, where the support bridge 190 is detached from support frame 113 and swings pivotally from lower mounting member 115. In other embodiments, the support frame 113 may have an elongate aperture or track running along the length of its leg, wherein upon collapse of support frame 113 to lower mounting member 115, the end of the support bridge 190 will slide up the support frame 113 and fit at least a portion of the support bridge 190 in the aperture. A pin may be input into the end of the bridge 190 so that the pin would slide in the elongate aperture or track. In such embodiment, the support bridge 190 would remain with the carrier 110 so that when stored a user would not lose the support bridge 190 and it would be kept in an organized stored position. In other embodiments, the bridge 190 may have a pivot point in the middle, that it will bend in the middle and each end segment of the bridge will fold in. In another embodiment the bridge may have an aperture along its length, and accordingly as the support member 113 is folded inward, a pin or the connection point will slide along this aperture.

Figure 22:
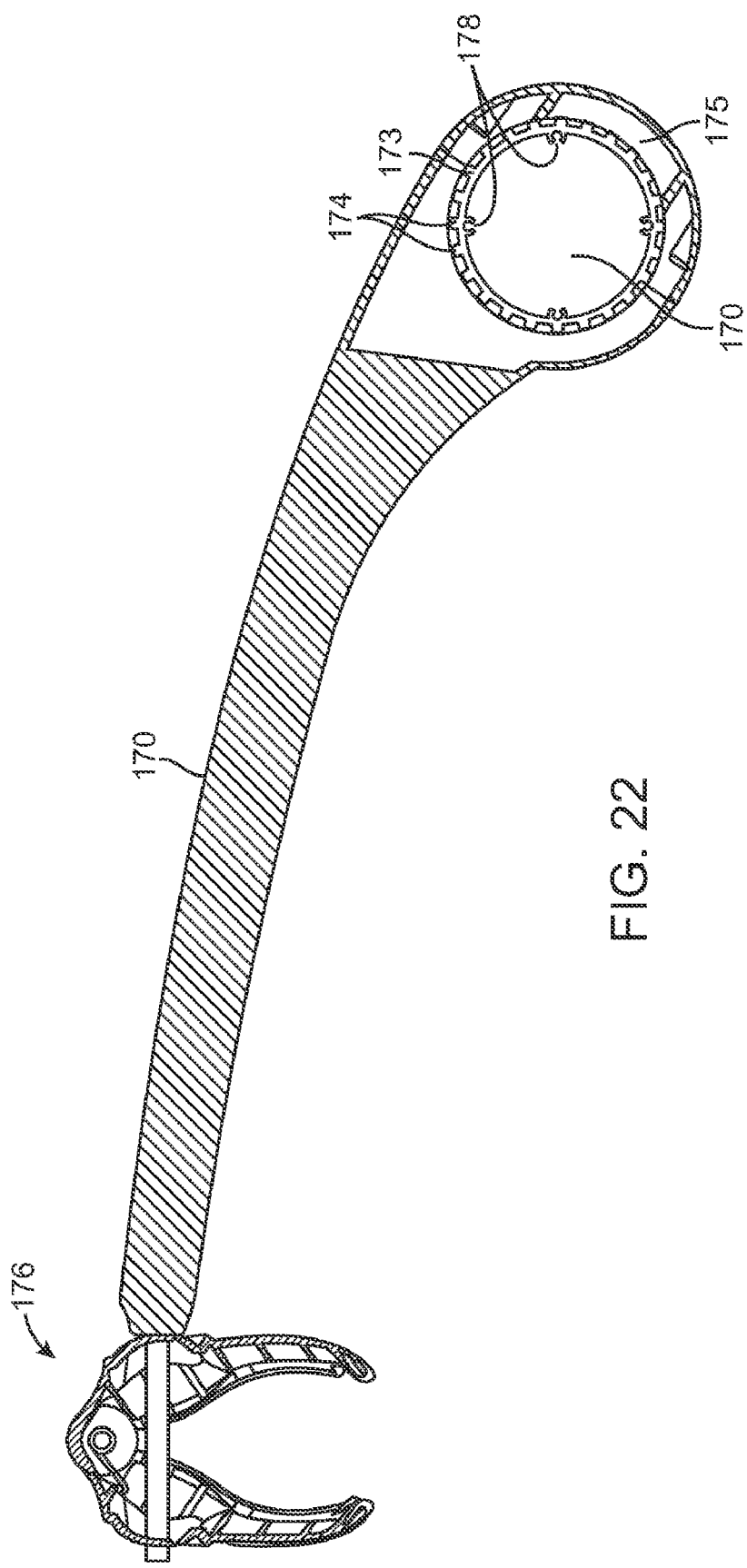
FIG. 22 is a cross-sectional view of one embodiment of a bicycle support arm.
Figure 23:
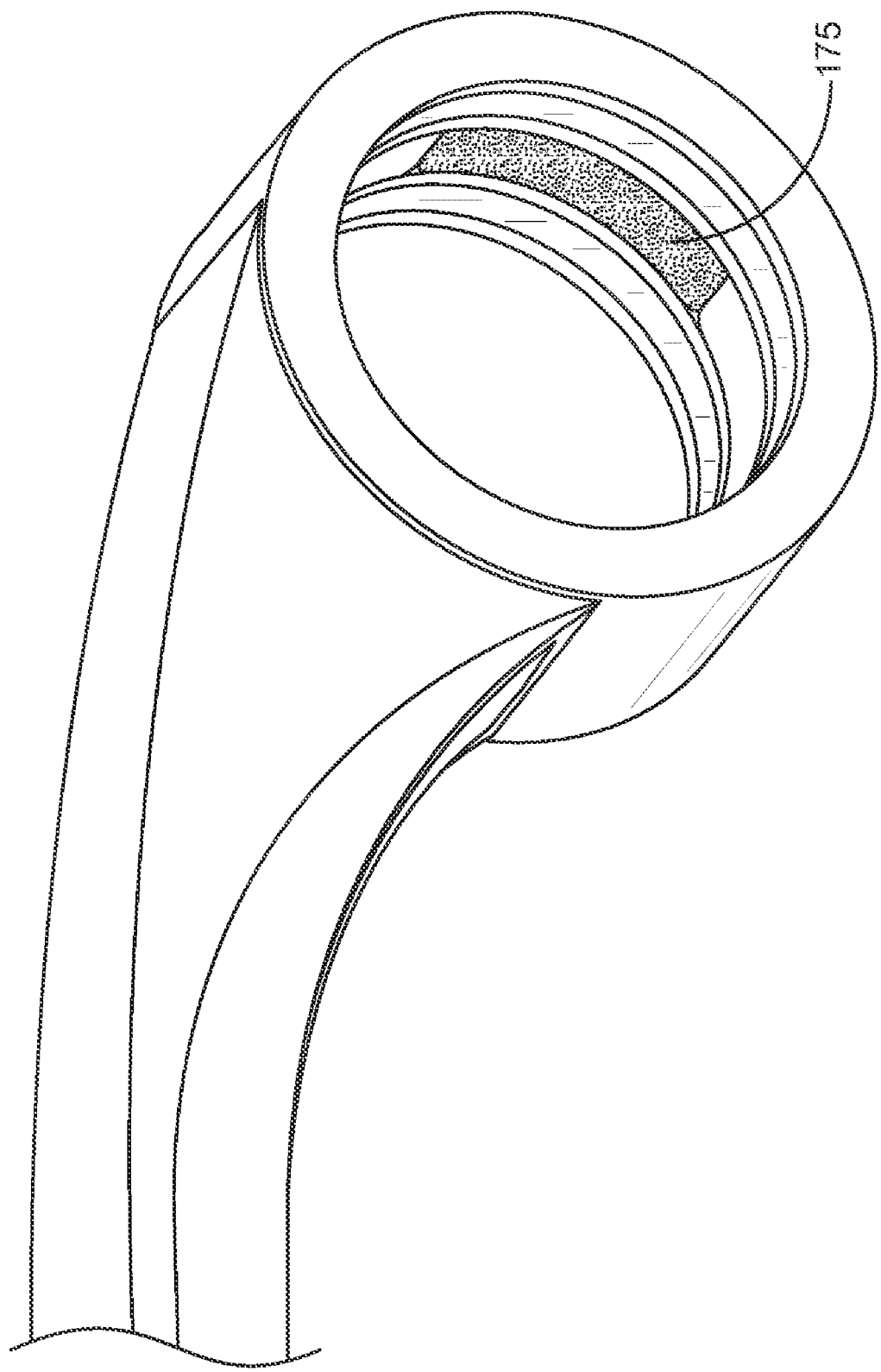
FIG. 23 is a perspective view of one embodiment of a frictional element in an aperture of a bicycle support arm.

As discussed previously, bicycle support arms 111, 111' are rotatable about hub 122. Referring now to FIG. 22, shown therein is a cross-sectional view of bicycle support arm 170 having a clamp 112. An aperture 171 is shown on the end of the bicycle support arm 170 which will be centered at hub 122 and receives an elongate member 173. The elongate member has teeth 174, or splines around the external surface of the elongate member and which contact the internal surface of the aperture 171. The aperture 171 of bicycle support arm 170 also has a frictional element 175. As illustrated in FIG. 23, the frictional element 175 may be positioned in the center of the aperture 171 and extend a portion around the internal surface of the aperture. In some embodiments the frictional element 175 is rubber, such as polyphenylene ether (PPE), or a soft plastic. The frictional element is positioned on the surface of the aperture against the teeth 174 of the elongate member 173. When the bicycle arm 170 is rotated, the frictional element 175 will rub against the teeth 174 causing a frictional resistance to its movement. This resistance is sufficient to rotate by force of hand, for example if a user attempts to manually rotate the bicycle arm 170. However, the resistance is also such that when the arm is not being manually adjusted by a user, it will maintain its rotational position. In this way the rotation of the arm 170 is infinitely adjustable around the hub 122 so that a user can place it any convenient position to secure the bicycle with the clamp 176. In FIG. 22, the elongate member 173 is also shown with fastening holes 178 to which the lower mounting member 115 can be fastened.

Examples have been described above regarding a rack arrangement. One of ordinary skill in the art, however, will appreciate that various modifications to and departures from the disclosed embodiments will occur to those having skill in the art.

What is claimed is:

1. A bicycle carrier rack for mounting to a vehicle, said rack having an arm extending away from said vehicle for carrying a bicycle, said arm comprising an attachment member on an underside of said arm having a locking portion suspended a distance from said arm and extending in the same longitudinal direction of said arm;

an anti-sway member removably attachable to said locking portion of said member, said anti-sway member having a contact portion for abutting against a bicycle installed in said bicycle carrier and an attachment portion on one end of said anti-sway member, said anti-sway member having an engaged position wherein said anti-sway member prevents sway of said bicycle;

said attachment portion enclosing a central aperture and having an opening in a side of said attachment portion to said central aperture;

said locking portion being sized to receive said opening of said anti-sway member when said anti-sway member is in a non-engaged position, and wherein said locking portion is sized to prevent passage through said opening when anti-sway member is in said engaged position, said anti-sway member being rotatable between said engaged and non-engaged positions.

2. The bicycle carrier rack of claim 1, wherein when said anti-sway member is in a non-engaged position said anti-sway member is rotated to an essentially horizontal position such that said opening in said side of said attachment portion is aligned with said locking portion for insertion thereon.

3. The bicycle carrier rack of claim 1, wherein said locking portion has vertical sides and horizontal sides and where said opening in said side of said attachment portion is sized to exceed that of the horizontal sides and said vertical sides are sized to exceed said opening whereby said openings align with said horizontal sides only when rotated to an essentially horizontal position.

* * * * *